(12) United States Patent
Nogi

(10) Patent No.: US 10,323,589 B2
(45) Date of Patent: Jun. 18, 2019

(54) EXHAUST GAS CONTROL APPARATUS FOR INTERNAL COMBUSTION ENGINE

(71) Applicant: TOYOTA JIDOSHA KABUSHIKI KAISHA, Toyota-shi, Aichi-ken (JP)

(72) Inventor: Yoshito Nogi, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 404 days.

(21) Appl. No.: 15/105,292

(22) PCT Filed: Dec. 20, 2013

(86) PCT No.: PCT/JP2013/084357
§ 371 (c)(1),
(2) Date: Jun. 16, 2016

(87) PCT Pub. No.: WO2015/092937
PCT Pub. Date: Jun. 25, 2015

(65) Prior Publication Data
US 2016/0312722 A1    Oct. 27, 2016

(51) Int. Cl.
*F01N 3/08*   (2006.01)
*F01N 9/00*   (2006.01)
(Continued)

(52) U.S. Cl.
CPC ....... *F02D 41/0275* (2013.01); *F01N 3/0814* (2013.01); *F01N 3/0842* (2013.01);
(Continued)

(58) Field of Classification Search
CPC combination set(s) only.
See application file for complete search history.

(56) References Cited

U.S. PATENT DOCUMENTS 5,839,415 A * 11/1998 Suzuki .................. F02D 41/008
                                                    123/491
6,325,041 B1 * 12/2001 Mamiya ................ F01N 3/0842
                                                    123/299

(Continued)

FOREIGN PATENT DOCUMENTS

EP    1 892 400 A2   2/2008
EP    1 990 527 A2   11/2008
(Continued)

*Primary Examiner* — Binh Q Tran
(74) *Attorney, Agent, or Firm* — Finnegan, Henderson, Farabow, Garrett & Dunner, LLP

(57) ABSTRACT

A rich control for temporarily declining an air-fuel ratio of exhaust gas discharged from an engine combustion chamber is performed by an additional fuel being injected into a cylinder in an expansion stroke or an exhaust stroke in a state where a throttle opening degree is switched from a base throttle opening degree to a throttle opening degree for the rich control and an EGR rate is switched from a base EGR rate to an EGR rate for the rich control. The rich control is terminated by returning the throttle opening degree (VTH) to the base throttle opening degree (VTHB), stopping the injection of the additional fuel (Qa), and temporarily increasing the amount of a main fuel (Qm). Then, an EGR control valve opening degree (VEGR) is controlled such that the EGR rate (REGR) is returned to the base EGR rate (REGRB).

17 Claims, 27 Drawing Sheets

(51) Int. Cl.
  *F02D 21/08*    (2006.01)
  *F02D 41/00*    (2006.01)
  *F02D 41/02*    (2006.01)
  *F02D 41/14*    (2006.01)
  *F02D 41/40*    (2006.01)

(52) U.S. Cl.
  CPC .............. *F01N 9/00* (2013.01); *F02D 21/08* (2013.01); *F02D 41/0002* (2013.01); *F02D 41/0007* (2013.01); *F02D 41/0055* (2013.01); *F02D 41/1462* (2013.01); *F02D 41/405* (2013.01); *F02D 2041/0017* (2013.01); *F02D 2200/0806* (2013.01); *Y02T 10/42* (2013.01); *Y02T 10/44* (2013.01); *Y02T 10/47* (2013.01)

(56) References Cited

U.S. PATENT DOCUMENTS

| | | | |
|---|---|---|---|
| 10,047,689 B2* | 8/2018 | Hotta | F01N 3/0842 |
| 2002/0020373 A1* | 2/2002 | Nishimura | F02D 21/08 |
| | | | 123/90.13 |
| 2005/0022511 A1* | 2/2005 | Miura | F02B 47/08 |
| | | | 60/285 |
| 2010/0018187 A1* | 1/2010 | Matsumoto | F01N 3/0814 |
| | | | 60/286 |

FOREIGN PATENT DOCUMENTS

| | | |
|---|---|---|
| EP | 2 503 121 A1 | 9/2012 |
| JP | 5-106518 | 4/1993 |
| JP | 2005-9316 | 1/2005 |
| JP | 2008-38803 | 2/2008 |
| JP | 2012-136948 A | 7/2012 |

* cited by examiner

FIG. 18

$L$ | $VTHB_{11}$ $VTHB_{21}$ ····· $VTHB_{m1}$
$VTHB_{12}$
⋮                    ⋮
$VTHB_{1n}$ ············ $VTHB_{mn}$
                                    $N$

FIG. 19

$L$ | $REGRB_{11}$ $REGRB_{21}$ ····· $REGRB_{m1}$
$REGRB_{12}$
⋮                    ⋮
$REGRB_{1n}$ ············ $REGRB_{mn}$
                                    $N$

FIG. 20

$L$ | $QmB_{11}$ $QmB_{21}$ ·········· $QmB_{m1}$
$QmB_{12}$
⋮                    ⋮
$QmB_{1n}$ ················ $QmB_{mn}$
                                    $N$

FIG. 21

$L$ | $\theta mB_{11}$ $\theta mB_{21}$ ·········· $\theta mB_{m1}$
$\theta mB_{12}$
⋮                    ⋮
$\theta mB_{1n}$ ················ $\theta mB_{mn}$
                                    $N$

FIG. 22

$$L \begin{array}{|cccc} VTHR_{11} & VTHR_{21} & \cdots\cdots & VTHR_{m1} \\ VTHR_{12} & & & \vdots \\ \vdots & & & \vdots \\ VTHR_{1n} & \cdots\cdots\cdots & & VTHR_{mn} \end{array}$$
N

FIG. 23

$$L \begin{array}{|cccc} REGRR_{11} & REGRR_{21} & \cdots\cdots & REGRR_{m1} \\ REGRR_{12} & & & \vdots \\ \vdots & & & \vdots \\ REGRR_{1n} & \cdots\cdots\cdots & & REGRR_{mn} \end{array}$$
N

FIG. 24

$$L \begin{array}{|cccc} QmR_{11} & QmR_{21} & \cdots\cdots\cdots & QmR_{m1} \\ QmR_{12} & & & \vdots \\ \vdots & & & \vdots \\ QmR_{1n} & \cdots\cdots\cdots\cdots & & QmR_{mn} \end{array}$$
N

FIG. 25

$$L \begin{array}{|cccc} \theta mR_{11} & \theta mR_{21} & \cdots\cdots & \theta mR_{m1} \\ \theta mR_{12} & & & \vdots \\ \vdots & & & \vdots \\ \theta mR_{1n} & \cdots\cdots\cdots\cdots & & \theta mR_{mn} \end{array}$$
N

FIG. 38

$$L \begin{array}{|cccc} REGRHB_{11} & REGRHB_{21} & \cdots & REGRHB_{m1} \\ REGRHB_{12} & & & \vdots \\ \vdots & & & \\ REGRHB_{1n} & \cdots\cdots\cdots\cdots & & REGRHB_{mn} \end{array}$$
$$N$$

FIG. 39

$$L \begin{array}{|cccc} REGRLB_{11} & REGRLB_{21} & \cdots & REGRLB_{m1} \\ REGRLB_{12} & & & \vdots \\ \vdots & & & \\ REGRLB_{1n} & \cdots\cdots\cdots\cdots & & REGRLB_{mn} \end{array}$$
$$N$$

FIG. 40

$$L \begin{array}{|cccc} REGRHR_{11} & REGRHR_{21} & \cdots & REGRHR_{m1} \\ REGRHR_{12} & & & \vdots \\ \vdots & & & \\ REGRHR_{1n} & \cdots\cdots\cdots\cdots & & REGRHR_{mn} \end{array}$$
$$N$$

FIG. 41

$$L \begin{array}{|cccc} REGRLR_{11} & REGRLR_{21} & \cdots & REGRLR_{m1} \\ REGRLR_{12} & & & \vdots \\ \vdots & & & \\ REGRLR_{1n} & \cdots\cdots\cdots\cdots & & REGRLR_{mn} \end{array}$$
$$N$$

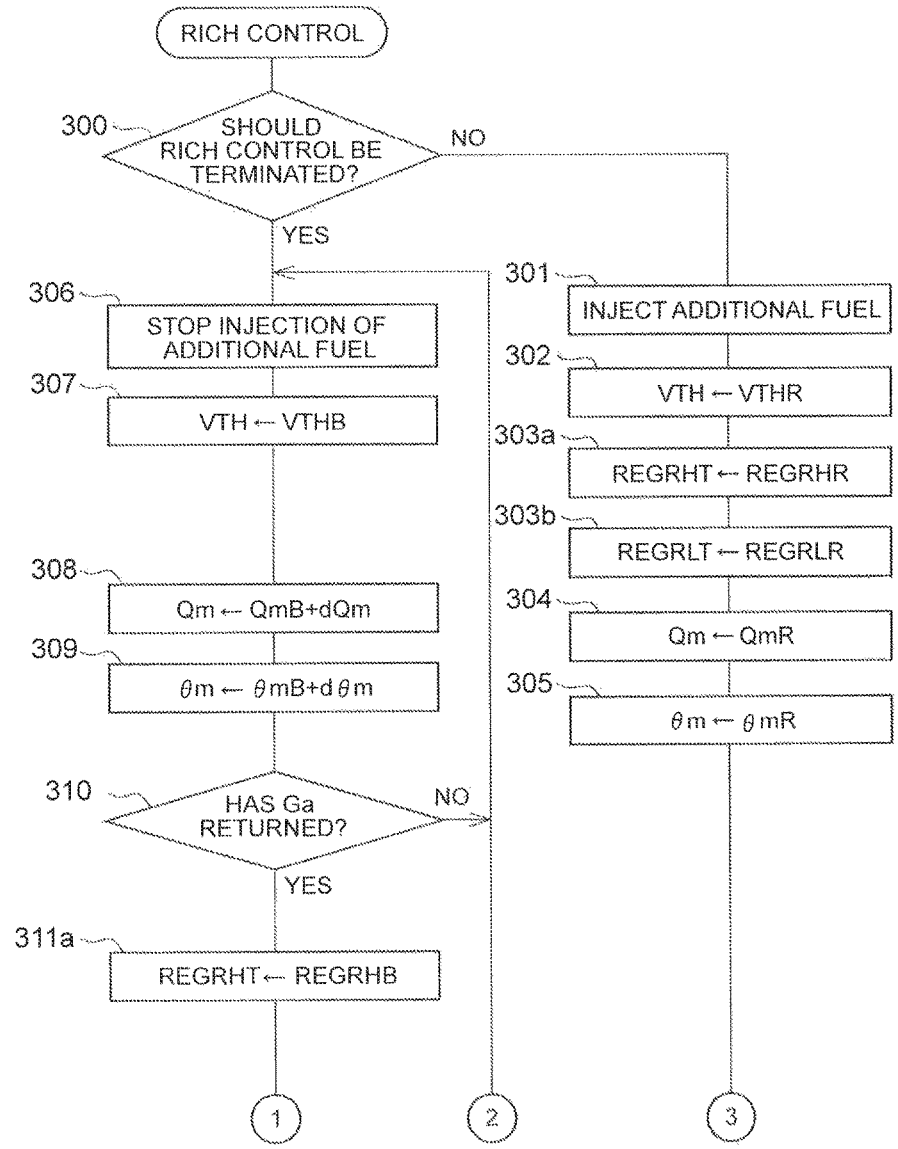

EXHAUST GAS CONTROL APPARATUS FOR INTERNAL COMBUSTION ENGINE

CROSS-REFERENCE TO RELATED APPLICATIONS

This application is a national phase application of International Application No. PCT/JP2013/084357, filed Dec. 20, 2013, the content of which is incorporated herein by reference.

TECHNICAL FIELD

The invention relates to an exhaust gas control apparatus for an internal combustion engine.

BACKGROUND ART

An exhaust gas control apparatus for an internal combustion engine is known (refer to PTL 1) in which an engine intake passage and an engine exhaust passage are connected to each other by an exhaust gas recirculation passage, an exhaust gas recirculation control valve controlling an exhaust gas recirculation rate is disposed in the exhaust gas recirculation passage, and a rich control for temporarily declining an air-fuel ratio of exhaust gas discharged from an engine combustion chamber is performed by an additional fuel being injected into a cylinder in an expansion stroke or an exhaust stroke in a state where a throttle opening degree is decreased and the exhaust gas recirculation rate is reduced. In this exhaust gas control apparatus, the rich control is terminated by returning the throttle opening degree, returning an exhaust gas recirculation control valve opening degree, and stopping the injection of the additional fuel. In this exhaust gas control apparatus, the rich control is performed in the state where the throttle opening degree is decreased and the exhaust gas recirculation rate is reduced, and thus an additional fuel amount that is required for the air-fuel ratio of the exhaust gas to be enriched can be reduced.

CITATION LIST

Patent Literature

PTL 1: Japanese Patent Application Publication No. 5-106518

SUMMARY OF THE INVENTION

When the rich control is performed, an intake pressure that is a pressure in the intake passage downstream of a throttle valve declines and an exhaust pressure that is a pressure in the exhaust passage rises. As a result, a pump loss that is represented by the difference between the exhaust pressure and the intake pressure increases. Once the rich control is terminated, that is, once the throttle opening degree is returned, the exhaust gas recirculation control valve opening degree is returned, and the injection of the additional fuel is stopped, the intake pressure and the exhaust pressure are returned, and thus the pump loss is returned as well.

However, the intake pressure and the exhaust pressure are not returned immediately after the termination of the rich control, and thus the pump loss is not immediately returned, either. In other words, the pump loss remains large for a while after the termination of the rich control. As a result, an engine output or torque temporarily declines immediately after the termination of the rich control, and thus an engine output fluctuation might increase.

An object of the invention is to provide an exhaust gas control apparatus for an internal combustion engine that is capable of suppressing an engine output fluctuation immediately after a rich control is terminated.

According to the invention, there is provided an exhaust gas control apparatus for an internal combustion engine in which an engine intake passage and an engine exhaust passage are connected to each other by an exhaust gas recirculation passage and an exhaust gas recirculation control valve controlling an exhaust gas recirculation rate is disposed in the exhaust gas recirculation passage, the exhaust gas control apparatus performing a rich control for temporarily declining an air-fuel ratio of exhaust gas discharged from an engine combustion chamber by injecting an additional fuel into a cylinder in an expansion stroke or an exhaust stroke in a state where a throttle opening degree, which is an opening degree of a throttle valve disposed in the intake passage and controlling a suctioned air amount, is switched from a base throttle opening degree to a throttle opening degree for the rich control lower than the base throttle opening degree and the exhaust gas recirculation rate is switched from a base exhaust gas recirculation rate to an exhaust gas recirculation rate for the rich control different from the base exhaust gas recirculation rate, wherein the rich control is terminated by controlling an exhaust gas recirculation control valve opening degree such that the exhaust gas recirculation rate is returned to the base exhaust gas recirculation rate after returning the throttle opening degree to the base throttle opening degree, stopping the injection of the additional fuel, and increasing the amount of a main fuel temporarily.

An engine output fluctuation can be suppressed immediately after the rich control is terminated.

BRIEF DESCRIPTION OF THE DRAWINGS

FIG. 18 is a drawing illustrating a map of a base throttle opening degree VTHB.

FIG. 19 is a drawing illustrating a map of a base EGR rate REGRB.

FIG. 20 is a drawing illustrating a map of a base main fuel amount QmB.

FIG. 21 is a drawing illustrating a map of a base main fuel injection timing θmB.

FIG. 22 is a drawing illustrating a map of a throttle opening degree VTHR for the rich control.

FIG. 23 is a drawing illustrating a map of an EGR rate REGRR for the rich control.

FIG. 24 is a drawing illustrating a map of a main fuel amount QmR for the rich control.

FIG. 25 is a drawing illustrating a map of a main fuel injection timing θmR for the rich control.

FIG. 38 is a drawing illustrating a map of a base high pressure side EGR rate REGRHB.

FIG. 39 is a drawing illustrating a map of a base low pressure side EGR rate REGRLB.

FIG. 40 is a drawing illustrating a map of a high pressure side EGR rate REGRHR for the rich control.

FIG. 41 is a drawing illustrating a map of a low pressure side EGR rate REGRLR for the rich control.

FIG. 42 is a flowchart for executing the rich control according to yet another example of the invention.

MODES FOR CARRYING OUT THE INVENTION

Figure 1:
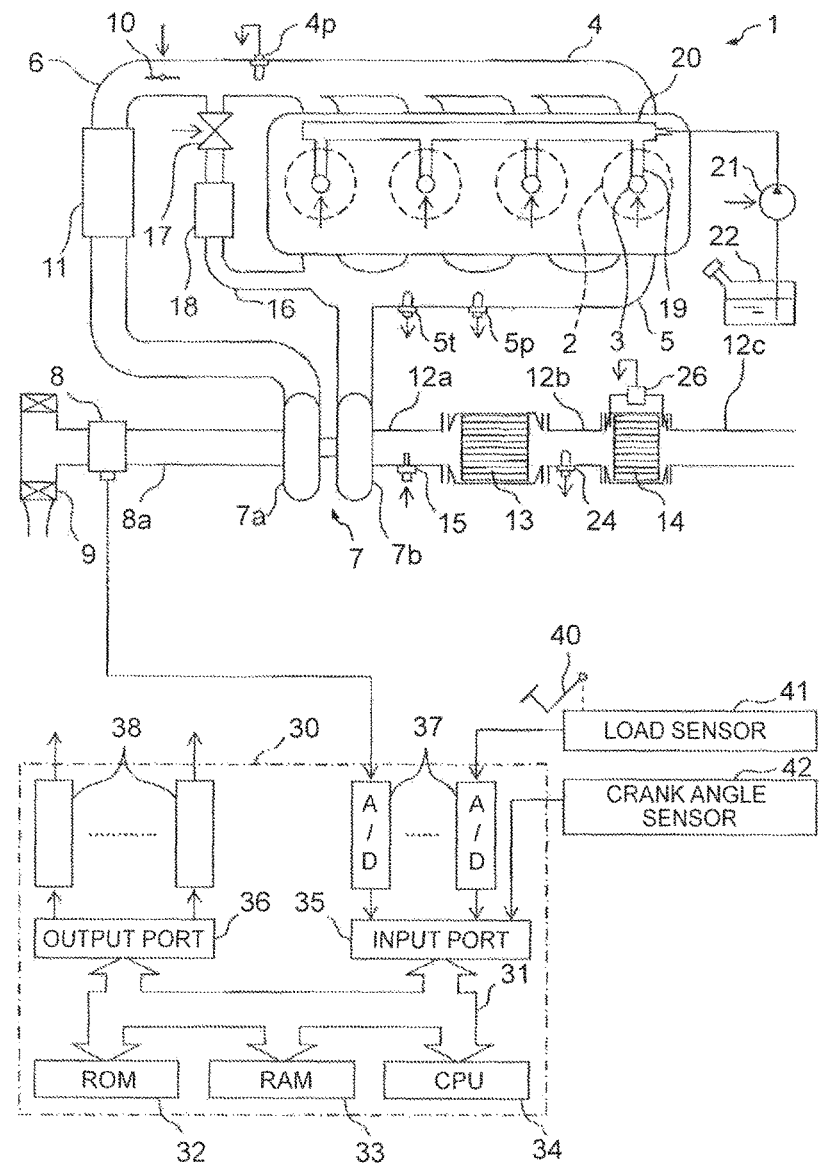
FIG. 1 is an overall view of a compression ignition-type internal combustion engine.

An overall view of a compression ignition-type internal combustion engine is illustrated in FIG. 1.

Referring to FIG. 1, 1 represents an engine main body, 2 represents respective combustion chambers of cylinders, 3 represents electronically controlled fuel injection valves for injecting a fuel into the respective combustion chambers 2, 4 represents an intake manifold, and 5 represents an exhaust manifold. The intake manifold 4 is connected to an outlet of a compressor 7a of an exhaust turbocharger 7 via an intake duct 6, and an inlet of the compressor 7a is connected to an air cleaner 9 via an intake air introduction pipe 8a where a suctioned air amount detector 8 is disposed. A throttle valve 10 that is driven by an actuator is disposed in the intake duct 6, and a cooling device 11 for cooling suctioned air flowing through the intake duct 6 is disposed around the intake duct 6. In the example that is illustrated in FIG. 1, engine cooling water is guided into the cooling device 11 and the suctioned air is cooled by the engine cooling water. In addition, a pressure sensor 4p for detecting a pressure in the intake manifold 4, that is, an intake pressure, is attached to the intake manifold 4 at a position on the downstream side of the throttle valve 10, and a pressure sensor 5p for detecting a pressure in the exhaust manifold 5, that is, an exhaust pressure, is attached to the exhaust manifold 5. Furthermore, a temperature sensor 5t for detecting the temperature of exhaust gas in the exhaust manifold 5 is attached to the exhaust manifold 5.

The exhaust manifold 5 is connected to an inlet of an exhaust turbine 7b of the exhaust turbocharger 7, and an outlet of the exhaust turbine 7b is connected to an inlet of an exhaust gas control catalyst 13 via an exhaust pipe 12a. In the example according to the invention, the exhaust gas control catalyst 13 is a NOx storage catalyst. An outlet of the exhaust gas control catalyst 13 is connected to a particulate filter 14 via an exhaust pipe 12b. In the exhaust pipe 12a, a hydrocarbon supply valve 15 for supplying hydrocarbons consisting of gas oil and other fuels used as a fuel of the compression ignition-type internal combustion engine is disposed on the upstream side of the exhaust gas control catalyst 13. In the example that is illustrated in FIG. 1, the gas oil is used as the hydrocarbon that is supplied from the hydrocarbon supply valve 15. An exhaust pipe 12c is connected to the particulate filter 14. The invention can also be applied to a spark ignition-type internal combustion engine in which combustion is performed at a lean air-fuel ratio. In this case, the hydrocarbon supply valve 15 supplies hydrocarbons consisting of gasoline and other fuels used as a fuel of the spark ignition-type internal combustion engine.

The exhaust manifold 5 and the intake manifold 4 are connected to each other via an exhaust gas recirculation (hereinafter, referred to as EGR) passage 16, and an electronically controlled EGR control valve 17 is disposed in the EGR passage 16. In addition, a cooling device 18 for cooling EGR gas flowing through the EGR passage 16 is disposed around the EGR passage 16. In the example that is illustrated in FIG. 1, the engine cooling water is guided into the cooling device 18 and the EGR gas is cooled by the engine cooling water. Each of the fuel injection valves 3 is connected to a common rail 20 via a fuel supply pipe 19, and this common rail 20 is connected to a fuel tank 22 via a fuel pump 21 that is electronically controlled and has a variable discharge amount. The fuel that is stored in the fuel tank 22 is supplied into the common rail 20 by the fuel pump 21, and the fuel supplied into the common rail 20 is supplied to the fuel injection valves 3 via the respective fuel supply pipes 19.

An electronic control unit 30 consists of a digital computer and is provided with a read-only memory (ROM) 32, a random access memory (RAM) 33, a CPU (microprocessor) 34, an input port 35, and an output port 36, which are connected to one another by a bidirectional bus 31. A temperature sensor 24 for detecting the temperature of the exhaust gas flowing out from the exhaust gas control catalyst 13 is attached to the exhaust pipe 12b on the downstream side of the exhaust gas control catalyst 13. The temperature of the exhaust gas flowing out from the exhaust gas control catalyst 13 represents the temperature of the exhaust gas control catalyst 13. In addition, a differential pressure sensor 26 for detecting a differential pressure across the particulate filter 14 is attached to the particulate filter 14. Output signals of the temperature sensor 24, the differential pressure sensor 26, the pressure sensors 4p, 5p, the temperature sensor 5t, and the suctioned air amount detector 8 are input to the input port 35 via respectively corresponding AD converters 37. In addition, a load sensor 41 that generates an output voltage which is proportional to a depression amount L of an accelerator pedal 40 is connected to the accelerator pedal 40, and the output voltage of the load sensor 41 is input to the input port 35 via the corresponding AD converter 37. Furthermore, a crank angle sensor 42 is connected to the input port 35, and the crank angle sensor 42 generates an output pulse each time a crankshaft rotates by, for example, 15°. The output port 36 is connected to the fuel injection valves 3, the actuator that drives the throttle valve 10, the hydrocarbon supply valve 15, the EGR control valve 17, and the fuel pump 21 via corresponding drive circuits 38.

Figure 2:
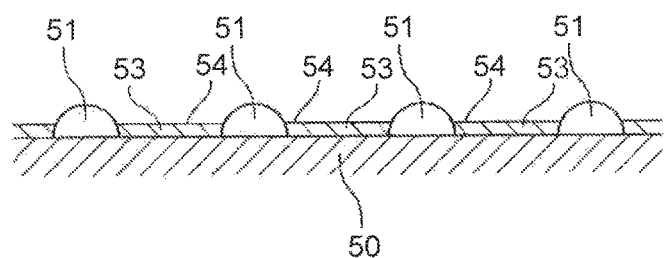
FIG. 2 is a drawing schematically illustrating a surface part of a catalyst carrier.

FIG. 2 schematically shows a surface part of a catalyst carrier that is supported on a substrate of the exhaust gas control catalyst 13 which is illustrated in FIG. 1. In this exhaust gas control catalyst 13, noble metal catalysts 51 consisting of platinum Pt are supported on a catalyst carrier 50 consisting of, for example, alumina and a basic layer 53 is formed on the catalyst carrier 50 as illustrated in FIG. 2. The basic layer 53 contains at least one selected from an alkali metal such as potassium K, sodium Na, and cesium Cs, an alkaline earth metal such as barium Ba and calcium Ca, a rare earth such as lanthanoid, and a metal capable of donating an electron to NOx such as silver Ag, copper Cu, iron Fe, and iridium Ir. Ceria $CeO_2$ is contained in this basic layer 53, and thus the exhaust gas control catalyst 13 has an oxygen storage capacity. In addition, rhodium Rh or palladium Pd can be supported, in addition to the platinum Pt, on the catalyst carrier 50 of the exhaust gas control catalyst 13. Because the exhaust gas flows along the top of the catalyst carrier 50, it can be said that the noble metal catalysts 51 are supported on an exhaust gas flow surface of the exhaust gas control catalyst 13. A surface of the basic layer 53 exhibits basicity, and thus the surface of the basic layer 53 will be referred to as a basic exhaust gas flow surface part 54.

Figure 3:
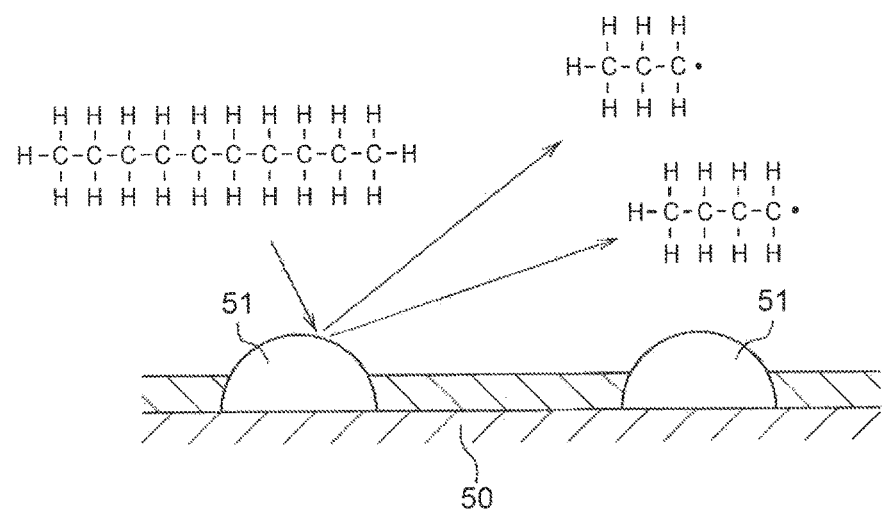
FIG. 3 is a drawing for showing an oxidation reaction in an exhaust gas control catalyst.

When the hydrocarbon is injected into the exhaust gas from the hydrocarbon supply valve 15, the hydrocarbon is reformed in the exhaust gas control catalyst 13. In the invention, NOx is removed in the exhaust gas control catalyst 13 by the use of the hydrocarbon reformed at this time. FIG. 3 schematically shows a reforming action that is performed in the exhaust gas control catalyst 13 at this time. As illustrated in FIG. 3, the hydrocarbon HC injected from the hydrocarbon supply valve 15 is turned into radical hydrocarbons HC with a small carbon number by the noble metal catalysts 51.

Figure 4:
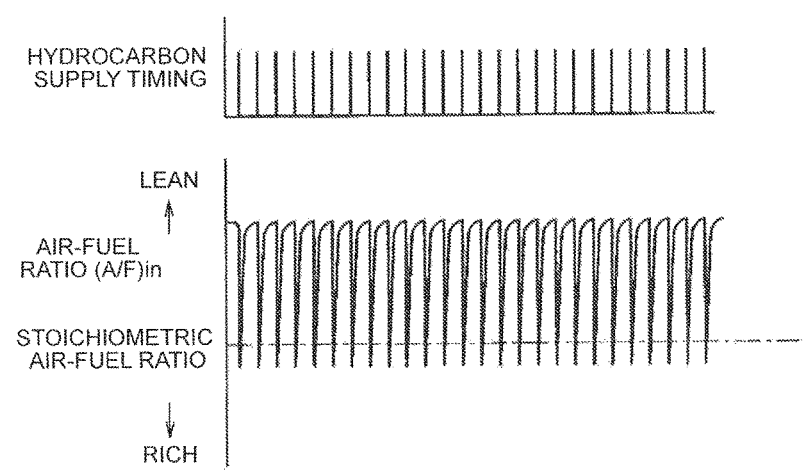
FIG. 4 is a drawing illustrating a change in an air-fuel ratio of exhaust gas flowing into the exhaust gas control catalyst.

FIG. 4 shows a timing of the hydrocarbon supply from the hydrocarbon supply valve 15 and a change in an air-fuel ratio (A/F)in of the exhaust gas flowing into the exhaust gas control catalyst 13. The change in this air-fuel ratio (A/F)in depends on a change in the concentration of the hydrocarbon in the exhaust gas flowing into the exhaust gas control catalyst 13, and thus it can be said that the change in the air-fuel ratio (A/F)in that is illustrated in FIG. 4 represents the change in the concentration of the hydrocarbon. Nevertheless, because the air-fuel ratio (A/F)in decreases as the hydrocarbon concentration increases, the hydrocarbon concentration is higher when the air-fuel ratio (A/F)in is on a rich side in FIG. 4.

Figure 5:
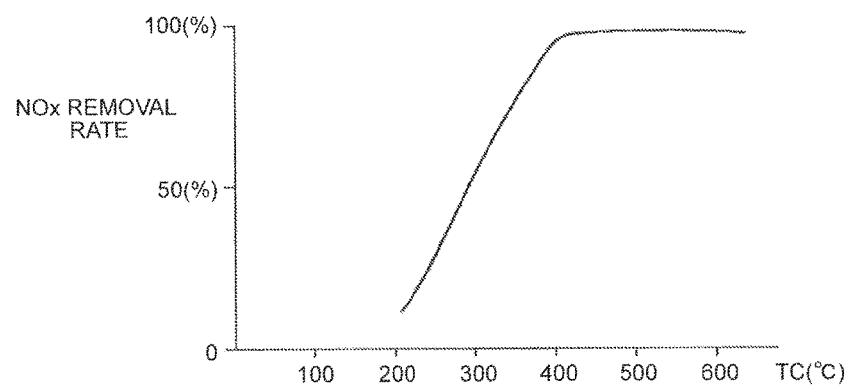
FIG. 5 is a drawing illustrating a NOx removal rate.

FIG. 5 shows, with respect to respective catalyst temperatures TC of the exhaust gas control catalyst 13, a NOx removal rate in the exhaust gas control catalyst 13 at a time when the air-fuel ratio (A/F)in of the exhaust gas flowing into the exhaust gas control catalyst 13 is periodically enriched as illustrated in FIG. 4 by the concentration of the hydrocarbons flowing into the exhaust gas control catalyst 13 being periodically changed. As a result of long-term researches on NOx removal, it has been found that an extremely high NOx removal rate can be obtained, even in a high-temperature region of at least 400° C. as illustrated in FIG. 5, when the concentration of the hydrocarbons flowing into the exhaust gas control catalyst 13 is vibrated at an amplitude within a range determined in advance and a cycle within a range determined in advance.

Figure 6A:
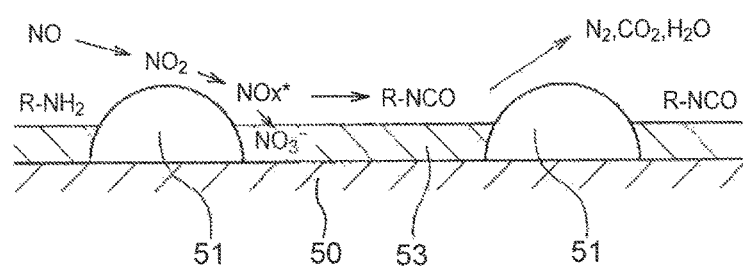
FIGS. 6A and 6B are drawings for showing a redox reaction in the exhaust gas control catalyst.
Figure 6B:
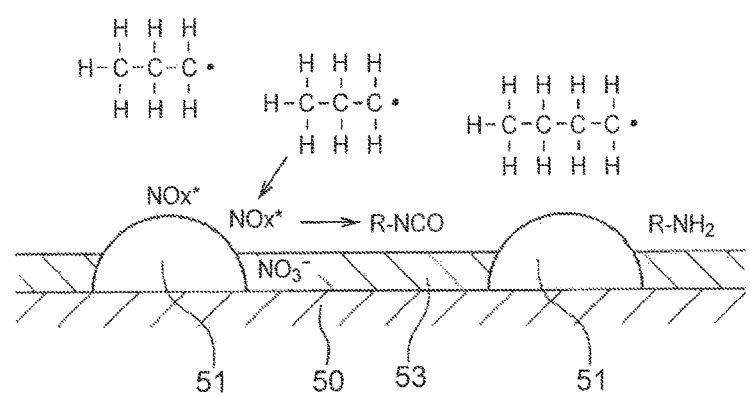

It has also been found that a large amount of reducing intermediates containing nitrogen and hydrocarbons continue to be held or adsorbed on the surface of the basic layer 53, that is, on the basic exhaust gas flow surface part 54 of the exhaust gas control catalyst 13 at this time and the reducing intermediate plays a central role for the achievement of the high NOx removal rate. Hereinafter, this will be described with reference to FIGS. 6A and 6B. FIGS. 6A and 6B schematically show the surface part of the catalyst carrier 50 of the exhaust gas control catalyst 13, and a reaction that is estimated to occur when the concentration of the hydrocarbons flowing into the exhaust gas control catalyst 13 is vibrated at the amplitude within the range determined in advance and the cycle within the range determined in advance is illustrated in FIGS. 6A and 6B.

FIG. 6A shows a time when the concentration of the hydrocarbons flowing into the exhaust gas control catalyst 13 is low, and FIG. 6B shows a time when the air-fuel ratio (A/F)in of the exhaust gas flowing into the exhaust gas control catalyst 13 has become rich with the hydrocarbons supplied from the hydrocarbon supply valve 15, that is, a time when the concentration of the hydrocarbons flowing into the exhaust gas control catalyst 13 is high.

As is apparent from FIG. 4, the air-fuel ratio of the exhaust gas that flows into the exhaust gas control catalyst 13 is maintained lean with the exception of one moment, and thus the exhaust gas that flows into the exhaust gas control catalyst 13 is usually in a hyperoxic state. At this time, some of the NO that is contained in the exhaust gas adheres onto the exhaust gas control catalyst 13, and some of the NO that is contained in the exhaust gas becomes $NO_2$ after being oxidized on the platinum 51 as illustrated in FIG. 6A. Then, this $NO_2$ is further oxidized and becomes $NO_3$. In addition, some of the $NO_2$ becomes $NO_2{-}$. Accordingly, $NO_2{-}$ and $NO_3$ are generated on the platinum Pt 51. The NO adhering on the exhaust gas control catalyst 13 and the $NO_2{-}$ and the $NO_3$ generated on the platinum Pt 51 have high levels of activity, and thus these NO, $NO_2{-}$, and $NO_3$ will be referred to as active NOx* hereinbelow.

When the air-fuel ratio (A/F)in of the exhaust gas flowing into the exhaust gas control catalyst 13 is enriched with the hydrocarbon supplied from the hydrocarbon supply valve 15, this hydrocarbon adheres to the entire exhaust gas control catalyst 13 in order. Most of these adhering hydrocarbons react with oxygen and are burned in order, and some of the adhering hydrocarbons are reformed in the exhaust gas control catalyst 13 and become radical in order as illustrated in FIG. 3. Accordingly, the hydrocarbon concentration around the active NOx* increases as illustrated in FIG. 6B. When a state where the concentration of the oxygen around the active NOx* is high continues for a certain period of time or longer after the active NOx* generation, the active NOx* is oxidized and is absorbed into the basic layer 53 in the form of a nitrate ion $NO_3$—. When the hydrocarbon concentration around the active NOx* is increased before the elapse of the certain period of time, however, the active NOx* reacts with the radical hydrocarbon HC on the platinum 51 and then the reducing intermediate is generated as illustrated in FIG. 6B. This reducing intermediate adheres or is adsorbed onto the surface of the basic layer 53.

It is conceivable that the reducing intermediate that is first generated at this time is a nitro compound R—$NO_2$. Once generated, this nitro compound R—$NO_2$ becomes a nitrile compound R—CN. However, this nitrile compound R—CN can survive only for an instant in that state, and immediately becomes an isocyanate compound R—NCO. When hydrolyzed, this isocyanate compound R—NCO becomes an amine compound R—$NH_2$. In this case, however, it is conceivable that it is a part of the isocyanate compound R—NCO that is hydrolyzed. Accordingly, it is conceivable that most of the reducing intermediates held or adsorbed on the surface of the basic layer 53 are the isocyanate compound R—NCO and the amine compound R—$NH_2$ as illustrated in FIG. 6B.

When the hydrocarbons HC adhere around the generated reducing intermediates as illustrated in FIG. 6B, the reducing intermediates are hampered by the hydrocarbons HC and no further reaction proceeds. In this case, the concentration of the hydrocarbons flowing into the exhaust gas control catalyst 13 declines, and then the hydrocarbons adhering around the reducing intermediates are oxidized and disappear. Once the concentration of the oxygen around the reducing intermediates increases as a result, the reducing intermediates react with the NOx and the active NOx* in the exhaust gas, react with the ambient oxygen, or autolyze. Then, the reducing intermediates R—NCO and R—$NH_2$ are converted to $N_2$, $CO_2$, and $H_2O$ as illustrated in FIG. 6A, which causes the NOx to be removed.

As described above, in the exhaust gas control catalyst 13, the reducing intermediates are generated by the concentration of the hydrocarbons flowing into the exhaust gas control catalyst 13 being increased, the reducing intermediates react with the NOx, active NOx*, and oxygen in the exhaust gas or autolyze when the oxygen concentration is increased after the decline in the concentration of the hydrocarbons flowing into the exhaust gas control catalyst 13, and then the NOx is removed. In other words, when the NOx is removed by the exhaust gas control catalyst 13, the concentration of the hydrocarbons flowing into the exhaust gas control catalyst 13 needs to be periodically changed.

As a matter of course, in this case, the hydrocarbon concentration needs to be raised to a concentration that is sufficiently high for the reducing intermediate generation and the hydrocarbon concentration needs to be lowered to a concentration that is sufficiently low for the generated reducing intermediates to react with the NOx, active NOx*, and oxygen in the exhaust gas or autolyze. In other words, the concentration of the hydrocarbons flowing into the exhaust gas control catalyst 13 is required to be vibrated at the amplitude within the range determined in advance. In this case, these reducing intermediates should be held on the basic layer 53, that is, on the basic exhaust gas flow surface part 54, until the generated reducing intermediates R—NCO and R—$NH_2$ react with the NOx, active NOx*, and oxygen in the exhaust gas or autolyze. This is a reason why the basic exhaust gas flow surface part 54 is disposed.

When the hydrocarbon supply cycle is extended, a period in which the oxygen concentration increases between the hydrocarbon supply and the next hydrocarbon supply is lengthened, and thus the active NOx* is absorbed into the basic layer 53 in the form of nitrate without generating the reducing intermediate. For this to be avoided, the concentration of the hydrocarbons flowing into the exhaust gas control catalyst 13 needs to be vibrated at the cycle within the range determined in advance.

In the example according to the invention, the noble metal catalysts 51 are supported on the exhaust gas flow surface of the exhaust gas control catalyst 13 so that the reducing intermediates R—NCO and R—$NH_2$ containing the nitrogen and the hydrocarbons are generated by the NOx contained in the exhaust gas and the reformed hydrocarbons reacting with each other, the basic exhaust gas flow surface part 54 is formed around the noble metal catalysts 51 so that the generated reducing intermediates R—NCO and R—$NH_2$ are held in the exhaust gas control catalyst 13, the reducing intermediates R—NCO and R—$NH_2$ held on the basic exhaust gas flow surface part 54 are converted to $N_2$, $CO_2$, and $H_2O$, and the hydrocarbon concentration vibration cycle is a vibration cycle that is required for the generation of the reducing intermediates R—NCO and R—$NH_2$ to continue. In this regard, the example that is illustrated in FIG. 4 has an injection interval of three seconds.

Figure 7A:
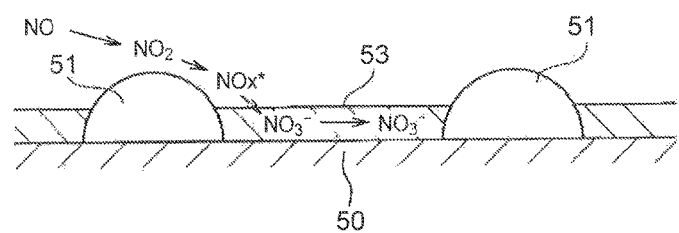
FIGS. 7A and 7B are drawings for showing the redox reaction in the exhaust gas control catalyst.

When the cycle of the vibration of the hydrocarbon concentration, that is, the cycle of the injection of the hydrocarbons HC from the hydrocarbon supply valve 15, exceeds the cycle within the range determined in advance described above, the reducing intermediates R—NCO and R—$NH_2$ disappear from the top of the surface of the basic layer 53. At this time, the active NOx* generated on the platinum Pt 51 diffuses in the basic layer 53 in the form of the nitrate ion $NO_3$— as illustrated in FIG. 7A and becomes nitrate. In other words, at that time, the NOx in the exhaust gas is absorbed into the basic layer 53 in the form of nitrate.

Figure 7B:
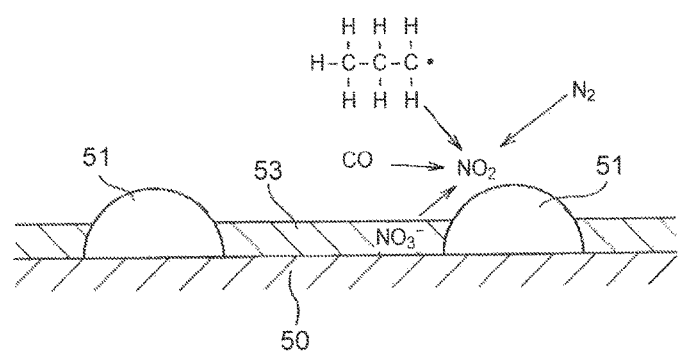

FIG. 7B shows a case where the air-fuel ratio of the exhaust gas flowing into the exhaust gas control catalyst 13 becomes a stoichiometric air-fuel ratio or is enriched when the NOx is absorbed into the basic layer 53 in the form of the nitrate as described above. In this case, the concentration of the oxygen in the exhaust gas declines, and thus the reaction proceeds in the reverse direction ($NO_3$—→$NO_2$). Accordingly, the nitrates absorbed in the basic layer 53 become the nitrate ions $NO_3$— in order and are released from the basic layer 53 in the form of $NO_2$ as illustrated in FIG. 7B. Then, the released $NO_2$ is reduced by the hydrocarbons HC and CO contained in the exhaust gas.

Figure 8:
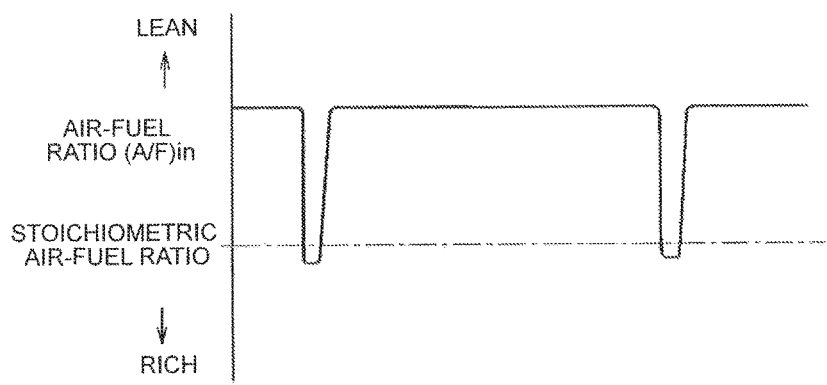
FIG. 8 is a drawing illustrating a change in the air-fuel ratio of the exhaust gas flowing into the exhaust gas control catalyst.

FIG. 8 shows a case where the air-fuel ratio (A/F)in of the exhaust gas flowing into the exhaust gas control catalyst 13 is temporarily enriched shortly before the saturation of the NOx absorption capacity of the basic layer 53. In the example that is illustrated in FIG. 8, this rich control has a time interval of at least one minute. In this case, the NOx absorbed into the basic layer 53 when the air-fuel ratio (A/F)in of the exhaust gas is lean is released at once from the basic layer 53 and is reduced when the air-fuel ratio (A/F)in of the exhaust gas is temporarily enriched. Accordingly, in this case, the basic layer 53 plays the role of an absorbent for temporary NOx absorption.

At this time, the basic layer 53 temporarily adsorbs the NOx in some cases. Accordingly, using the term of storage as a term including both absorption and adsorption, the basic layer 53 at this time plays the role of a NOx storing agent for temporary NOx storage. In other words, referring to the ratio of the air and the fuel (hydrocarbon) supplied into the engine intake passage, the combustion chambers 2, and the exhaust passage on the upstream side of the exhaust gas control catalyst 13 as the air-fuel ratio of the exhaust gas, the exhaust gas control catalyst 13 in this case functions as a NOx storage catalyst that stores the NOx when the air-fuel ratio of the exhaust gas is lean and releases the stored NOx once the oxygen concentration in the exhaust gas declines.

Figure 9:
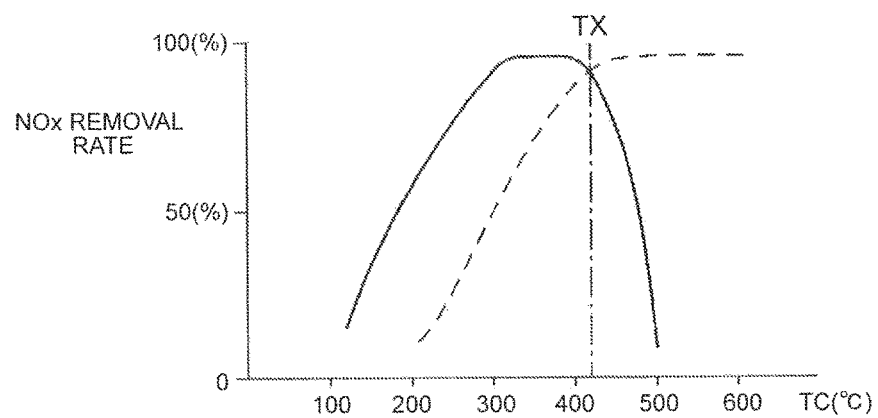
FIG. 9 is a drawing illustrating the NOx removal rate.

The solid line in FIG. 9 represents the NOx removal rate at a time when the exhaust gas control catalyst 13 is allowed to function as the NOx storage catalyst as described above. The horizontal axis in FIG. 9 represents the catalyst temperature TC of the exhaust gas control catalyst 13. In a case where the exhaust gas control catalyst 13 is allowed to function as the NOx storage catalyst as described above, an extremely high NOx removal rate can be obtained when the catalyst temperature TC is 300° C. to 400° C. but the NOx removal rate declines once the catalyst temperature TC reaches a high temperature of at least 400° C. as illustrated with the solid line in FIG. 9. In FIG. 9, the NOx removal rate that is illustrated in FIG. 5 is illustrated with a dashed line.

The above-described decline in the NOx removal rate at the catalyst temperature TC of 400° C. or higher is because the nitrate is thermally decomposed and is released from the exhaust gas control catalyst 13 in the form of $NO_2$ once the catalyst temperature TC becomes equal to or higher than 400° C. In other words, it is difficult to obtain a high NOx removal rate when the catalyst temperature TC is high insofar as the NOx is stored in the form of the nitrate. By the novel NOx removal control that is illustrated in FIGS. 4 to 6B, however, no nitrate is generated or an extremely small amount of the nitrate is generated even if the nitrate is generated as is apparent from FIGS. 6A and 6B, and thus a high NOx removal rate can be obtained as illustrated in FIG. 5 even when the catalyst temperature TC is high.

In the example according to the invention, the hydrocarbon supply valve 15 for supplying the hydrocarbons is disposed in the engine exhaust passage, the exhaust gas control catalyst 13 is disposed in the engine exhaust passage on the downstream side of the hydrocarbon supply valve 15, the noble metal catalysts 51 are supported on the exhaust gas flow surface of the exhaust gas control catalyst 13, and the basic exhaust gas flow surface part 54 is formed around the noble metal catalysts 51 so that NOx is removed by the use of this novel NOx removal control. The exhaust gas control catalyst 13 has the property of reducing the NOx that is contained in the exhaust gas when the concentration of the hydrocarbons flowing into the exhaust gas control catalyst 13 is vibrated at the amplitude within the range determined in advance and the cycle within the range determined in advance and the property of having an increasing amount of storage of the NOx contained in the exhaust gas when the hydrocarbon concentration vibration cycle exceeds this range determined in advance. While the engine is in operation, the hydrocarbons are injected from the hydrocarbon supply valve 15 at a cycle determined in advance, and then the NOx contained in the exhaust gas is reduced in the exhaust gas control catalyst 13.

In other words, it can be said that the NOx removal control that is illustrated in FIGS. 4 to 6B is a novel NOx removal control by which the NOx is removed with little nitrate formation in a case where the exhaust gas control catalyst where the basic layer is formed to be capable of supporting the noble metal catalyst and absorbing the NOx is used. In actuality, compared to a case where the exhaust gas control catalyst 13 is allowed to function as the NOx storage catalyst, the nitrate that is detected from the basic layer 53 has an extremely small amount in a case where this novel NOx removal control is used. Hereinafter, this novel NOx removal control will be referred to as a first NOx removal control.

Figure 10:
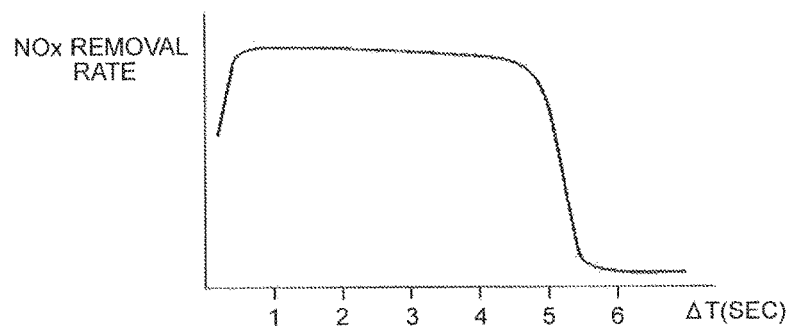
FIG. 10 is a drawing illustrating a relationship between a hydrocarbon injection cycle ΔT and the NOx removal rate.

As described above, when the cycle ΔT of the hydrocarbon injection from the hydrocarbon supply valve 15 is extended, the period in which the oxygen concentration around the active NOx* increases is lengthened between the hydrocarbon injection and the next hydrocarbon injection. In this case, in the example that is illustrated in FIG. 1, the active NOx* begins to be absorbed into the basic layer 53 in the form of the nitrate once the hydrocarbon injection cycle ΔT exceeds approximately five seconds. Accordingly, as illustrated in FIG. 10, the NOx removal rate declines once the hydrocarbon concentration vibration cycle ΔT exceeds approximately five seconds. Hence, in the example that is illustrated in FIG. 1, the hydrocarbon injection cycle ΔT is required to be five seconds or less.

In the example according to the invention, the injected hydrocarbons begin to be deposited on the exhaust gas flow surface of the exhaust gas control catalyst 13 once the hydrocarbon injection cycle ΔT becomes approximately 0.3 seconds or less. Accordingly, as illustrated in FIG. 10, the NOx removal rate declines once the hydrocarbon injection cycle ΔT becomes approximately 0.3 seconds or less. In this regard, in the example according to the invention, the hydrocarbon injection cycle is between 0.3 seconds and five seconds.

Figure 11:
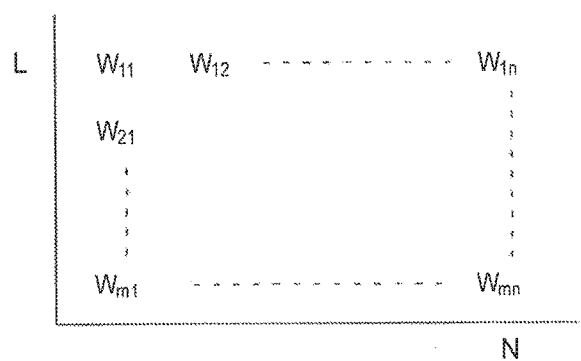
FIG. 11 is a map illustrating a hydrocarbon injection quantity.

In the example according to the invention, the air-fuel ratio (A/F)in of the exhaust gas flowing into the exhaust gas control catalyst 13 and the injection cycle ΔT are controlled to have optimum values in accordance with engine operation states by the quantity and timing of the hydrocarbon injection from the hydrocarbon supply valve 15 being changed. In this case, in the example according to the invention, an optimal hydrocarbon injection quantity W at a time when a NOx removal action according to the first NOx removal control is performed is stored in advance in the ROM 32 in the form of the map which is illustrated in FIG. 11 and as a function of the depression amount L of the accelerator pedal 40 and an engine rotation speed N and an optimal hydrocarbon injection cycle ΔT at that time is also stored in advance in the ROM 32 in the form of a map and as the function of the depression amount L of the accelerator pedal 40 and the engine rotation speed N.

Hereinafter, a NOx removal control in a case where the exhaust gas control catalyst 13 is allowed to function as the NOx storage catalyst will be described in detail with reference to FIGS. 12 to 15. The NOx removal control in the case where the exhaust gas control catalyst 13 is allowed to function as the NOx storage catalyst as described above will be referred to as a second NOx removal control hereinbelow.

Figure 12:
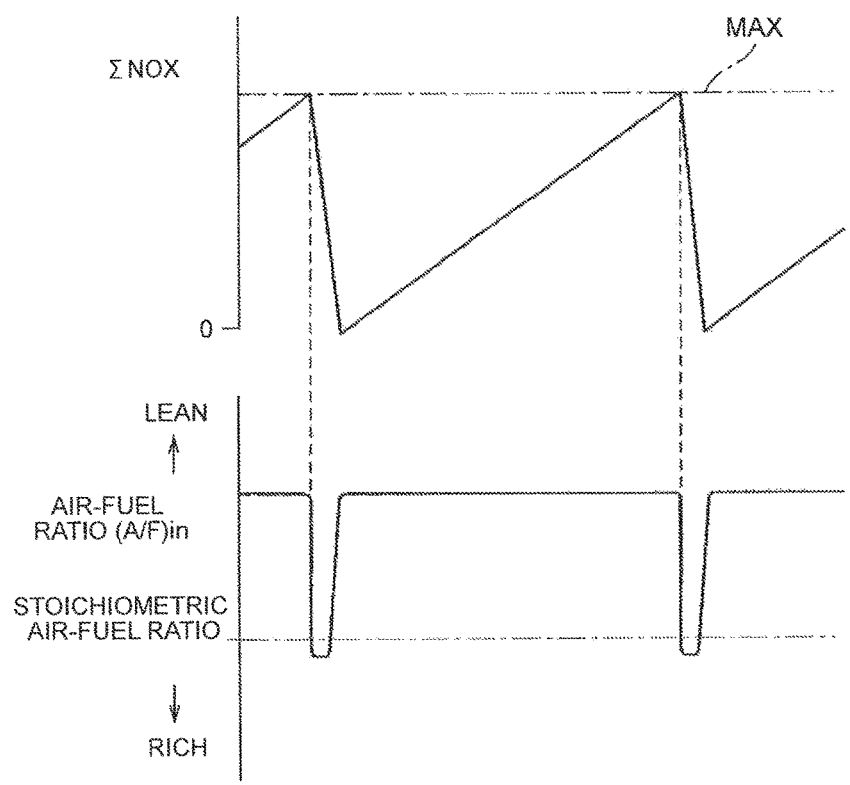
FIG. 12 is a drawing illustrating a NOx release control.

In this second NOx removal control, the air-fuel ratio (A/F)in of the exhaust gas flowing into the exhaust gas control catalyst 13 is temporarily enriched, as illustrated in FIG. 12, when the amount ΣNOX of the NOx stored in the basic layer 53 exceeds an allowable amount MAX determined in advance. Once the air-fuel ratio (A/F)in of the exhaust gas is enriched, the NOx stored in the basic layer 53 when the air-fuel ratio (A/F)in of the exhaust gas is lean is released at once from the basic layer 53 and is reduced. This causes the NOx to be removed.

Figure 13:
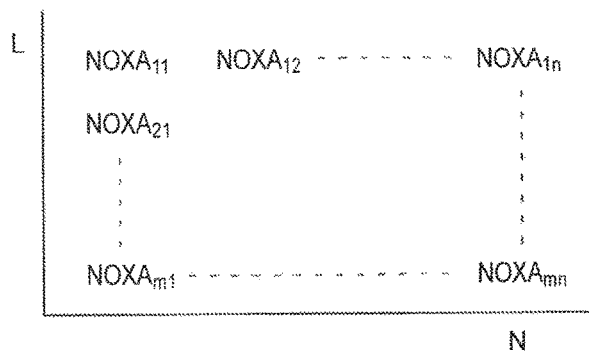
FIG. 13 is a drawing illustrating a map of a discharged NOx amount NOXA.

The stored NOx amount ΣNOX is calculated from, for example, the amount of the NOx that is discharged from the engine. In the example according to the invention, the amount NOXA of the NOx discharged from the engine per unit time is stored in advance in the ROM 32 in the form of the map which is illustrated in FIG. 13 and as the function of the depression amount L of the accelerator pedal 40 and the engine rotation speed N, and the stored NOx amount ΣNOX is calculated from this discharged NOx amount NOXA. In this case, the cycle in which the air-fuel ratio (A/F)in of the exhaust gas is enriched as described above is usually at least one minute.

Figure 14:
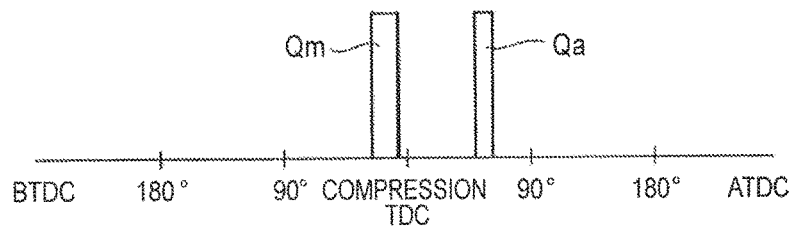
FIG. 14 is a drawing illustrating a fuel injection timing.
Figure 15:
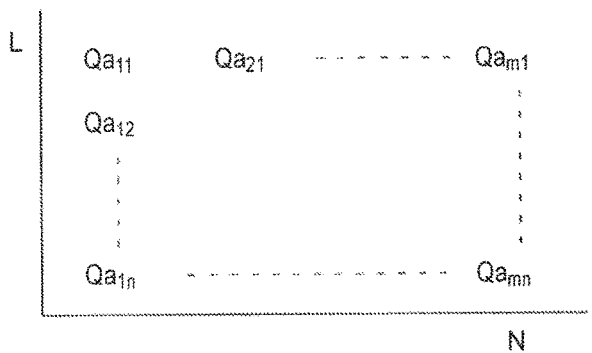
FIG. 15 is a drawing illustrating a map of an additional fuel amount Qa.

According to the second NOx removal control, the air-fuel ratio (A/F)in of the exhaust gas flowing into the exhaust gas control catalyst 13 is enriched by an additional fuel Qa as well as a fuel for combustion, that is, a main fuel Qm, being injected from the fuel injection valves 3 into the combustion chambers 2 as illustrated in FIG. 14. The horizontal axis in FIG. 14 represents a crank angle. As an example, this additional fuel Qa is injected after a compression top dead center and slightly before the ATDC 90°. This additional fuel amount Qa is stored in advance in the ROM 32 in the form of the map which is illustrated in FIG. 15 and as the function of the depression amount L of the accelerator pedal 40 and the engine rotation speed N.

In the example according to the invention, the NOx removal action according to the first NOx removal control and a NOx removal action according to the second NOx removal control are selectively performed. Whether to perform the NOx removal action according to the first NOx removal control or the NOx removal action according to the second NOx removal control is determined, for example, as follows. In other words, the NOx removal rate at a time when the NOx removal action according to the first NOx removal control is performed begins to decline rapidly, as illustrated in FIG. 5, once the temperature TC of the exhaust gas control catalyst 13 becomes equal to or lower than a limit temperature TX. In contrast, the NOx removal rate at a time when the NOx removal action according to the second NOx removal control is performed declines relatively slowly, as illustrated in FIG. 9, when the temperature TC of the exhaust gas control catalyst 13 declines. Accordingly, in the example according to the invention, the NOx removal action according to the first NOx removal control is performed when the temperature TC of the exhaust gas control catalyst 13 is higher than the limit temperature TX and the NOx removal action according to the second NOx removal control is performed when the temperature TC of the exhaust gas control catalyst 13 is lower than the limit temperature TX.

Referring to the ratio of the amount of the EGR gas that is supplied from the EGR passage 16 into the combustion chambers 2 to the total amount of the gas that is supplied into the combustion chambers 2 as an EGR rate, the opening degree of the EGR control valve 17 is controlled such that the actual EGR rate corresponds to a target EGR rate in the example according to the invention. The total amount G of the gas that is supplied into the combustion chambers 2 is calculated based on the intake pressure that is detected by the pressure sensor 4p, and an EGR gas amount Ge is calculated based on the intake pressure that is detected by the pressure sensor 4p, the exhaust pressure that is detected by the pressure sensor 5p, and the opening degree of the EGR control valve 17. Accordingly, an actual EGR rate REGR is calculated (REGR=Ge/G).

In the example according to the invention, the rich control for temporarily declining the air-fuel ratio of the exhaust gas that is discharged from the combustion chambers 2 is performed so that the air-fuel ratio (A/F)in of the exhaust gas flowing into the exhaust gas control catalyst 13 is enriched with regard to the second NOx removal control as described above. In this case, the rich control is performed by the additional fuel Qa being injected into the combustion chambers 2. In a case where the hydrocarbon is not supplied from the hydrocarbon supply valve 15, the air-fuel ratio (A/F)in of the exhaust gas flowing into the exhaust gas control catalyst 13 corresponds to the air-fuel ratio of the exhaust gas that is discharged from the combustion chambers 2.

Figure 16:
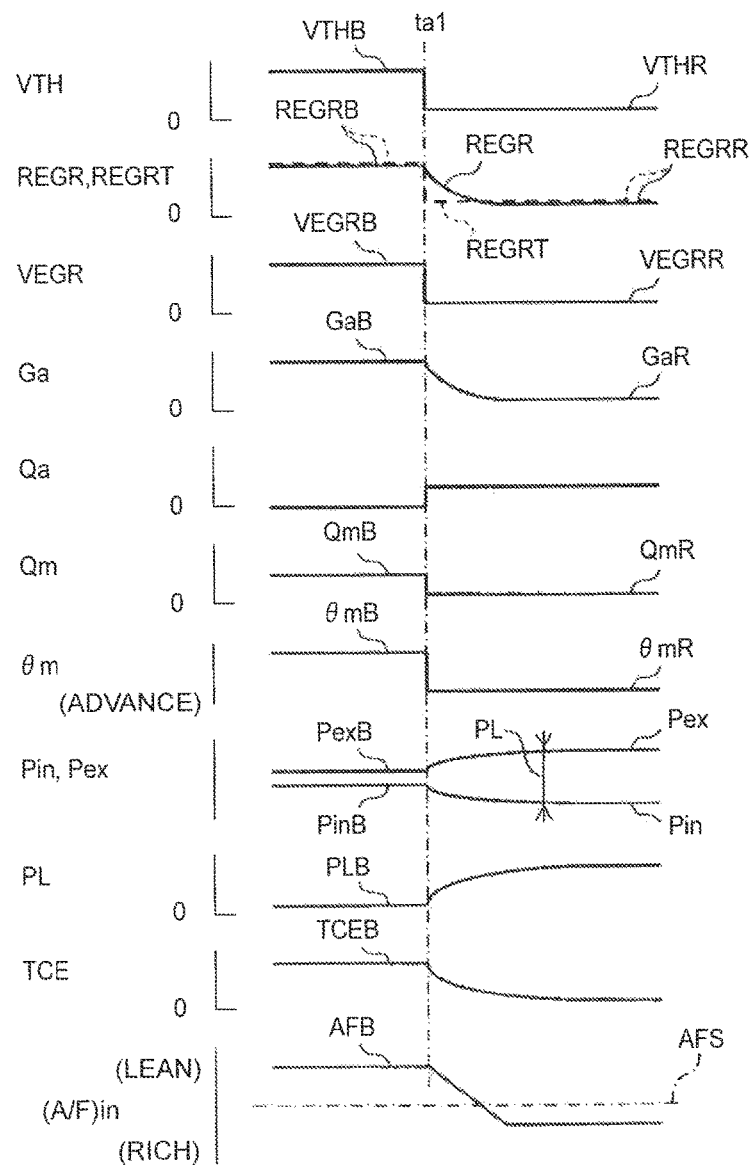
FIG. 16 is a time chart showing a time when a rich control is initiated.

FIG. 16 is a time chart showing a time when the rich control is initiated in the internal combustion engine that is illustrated in FIG. 1. Time ta1 in FIG. 16 represents a timing at which a signal is issued for the initiation of the rich control.

Before time ta1, that is, during a normal control in which the rich control is not performed, a throttle opening degree VTH is set to a base throttle opening degree VTHB. As a result, a suctioned air amount Ga becomes a base suctioned air amount GaB that is determined in accordance with the base throttle opening degree VTHB. The base throttle opening degree VTHB is stored in advance in the ROM 32 in the form of the map which is illustrated in FIG. 18 and as the function of the depression amount L of the accelerator pedal 40 and the engine rotation speed N.

In addition, a target EGR rate REGRT is set to a base EGR rate REGRB. In other words, an EGR control valve opening degree VEGR becomes a base EGR control valve opening degree VEGRB that is required for the actual EGR rate to become the base EGR rate REGRB. As a result, the EGR rate REGR becomes the base EGR rate REGRB. The base EGR rate REGRB is stored in advance in the ROM 32 in the form of the map which is illustrated in FIG. 19 and as the function of the depression amount L of the accelerator pedal 40 and the engine rotation speed N.

Furthermore, the additional fuel amount Qa is set to zero. In other words, the additional fuel Qa is not injected. As a result, the air-fuel ratio (A/F)in of the exhaust gas becomes a base air-fuel ratio AFB that is leaner than a stoichiometric air-fuel ratio AFS.

Moreover, the main fuel Qm is set to a base main fuel amount QmB. The base main fuel amount QmB is the amount of the fuel that is required for the generation of a required output. The base main fuel amount QmB is stored in advance in the ROM 32 in the form of the map which is illustrated in FIG. 20 and as the function of the depression amount L of the accelerator pedal 40 and the engine rotation speed N.

Moreover, a main fuel injection timing θm is set to a base injection timing θmB. The base injection timing θmB is stored in advance in the ROM 32 in the form of the map which is illustrated in FIG. 21 and as the function of the depression amount L of the accelerator pedal 40 and the engine rotation speed N.

In this case, an intake pressure Pin becomes a base intake pressure PinB and an exhaust pressure Pex becomes a base exhaust pressure PexB. Accordingly, a pump loss PL (=Pex—Pin) that is represented by the difference between the exhaust pressure Pex and the intake pressure Pin becomes a base pump loss PLB (=PexB−PinB). Considering that the intake pressure Pin and the exhaust pressure Pex are determined in accordance with the throttle opening degree VTH and the EGR rate REGR, the base pump loss PLB is determined in accordance with the base throttle opening degree VTHB and the base EGR rate REGRB.

A compression end temperature TCE becomes a base compression end temperature TCEB. Considering that the compression end temperature TCE is determined in accordance with an in-cylinder gas amount and the in-cylinder gas amount is determined in accordance with the throttle opening degree VTH and the EGR rate REGR, the base compression end temperature TCEB is determined in accordance with the base throttle opening degree VTHB and the base EGR rate REGRB.

Once the signal for the initiation of the rich control is issued at time ta1, the throttle opening degree VTH is switched from the base throttle opening degree VTHB to a throttle opening degree VTHR for the rich control that is lower than the base throttle opening degree VTHB. As a result, the suctioned air amount Ga decreases to a suctioned air amount GaR for the rich control. The throttle opening degree VTHR for the rich control is stored in advance in the ROM 32 in the form of the map which is illustrated in FIG. 22 and as the function of the depression amount L of the accelerator pedal 40 and the engine rotation speed N.

In addition, the target EGR rate REGRT is switched from the base EGR rate REGRB to an EGR rate REGRR for the rich control that is different from the base EGR rate REGRB, which causes the EGR control valve opening degree VEGR to be switched from the base EGR control valve opening degree VEGR to an EGR control valve opening degree VEGRR for the rich control that is different from the base EGR control valve opening degree VEGR. The EGR control valve opening degree VEGRR for the rich control is an EGR control valve opening degree that is required for the EGR rate REGR to become the EGR rate REGRR for the rich control. In the example that is illustrated in FIG. 16, the target EGR rate REGRT is lowered, and thus the EGR control valve opening degree VEGR is lowered. As a result, the EGR rate REGR declines to the EGR rate REGRR for the rich control. The EGR rate REGRR for the rich control is stored in advance in the ROM 32 in the form of the map which is illustrated in FIG. 23 and as the function of the depression amount L of the accelerator pedal 40 and the engine rotation speed N.

When the EGR rate is declined by the suctioned air amount Ga being decreased as described above, the additional fuel Qa that is required for the air-fuel ratio (A/F)in of the exhaust gas to be enriched can be reduced.

Furthermore, the injection of the additional fuel Qa is initiated. As a result, the air-fuel ratio (A/F)in of the exhaust gas declines from the base air-fuel ratio AFB. In the example that is illustrated in FIG. 16, the air-fuel ratio (A/F)in of the exhaust gas becomes richer than the stoichiometric air-fuel ratio AFS.

Moreover, the main fuel amount Qm is switched from the base main fuel amount QmB to a main fuel amount QmR for the rich control that is different from the base main fuel amount QmB. In the example that is illustrated in FIG. 16, a slight engine output is generated by some of the additional fuel Qa is burned in the combustion chambers 2. In this regard, during the rich control, the amount of the main fuel Qm is slightly decreased such that the actual engine output corresponds to the required output. The main fuel amount QmR for the rich control is stored in advance in the ROM 32 in the form of the map which is illustrated in FIG. 24 and as the function of the depression amount L of the accelerator pedal 40 and the engine rotation speed N.

Moreover, the main fuel injection timing θm is switched from the base injection timing θmB to an injection timing θmR for the rich control that is different from the base injection timing θmB. In the example that is illustrated in FIG. 16, the main fuel injection timing θm is advanced. This is because the progress of the combustion becomes slow during the rich control. The injection timing θmR for the rich control is stored in advance in the ROM 32 in the form of the map which is illustrated in FIG. 25 and as the function of the depression amount L of the accelerator pedal 40 and the engine rotation speed N.

As a result, the intake pressure Pin declines from the base intake pressure PinB and the exhaust pressure Pex rises from the base exhaust pressure PexB as illustrated in FIG. 16. Accordingly, the pump loss PL increases from the base pump loss PLB. In addition, because the in-cylinder gas amount decreases during the rich control, the compression end temperature TCE declines from the base compression end temperature TCEB.

Figure 17:
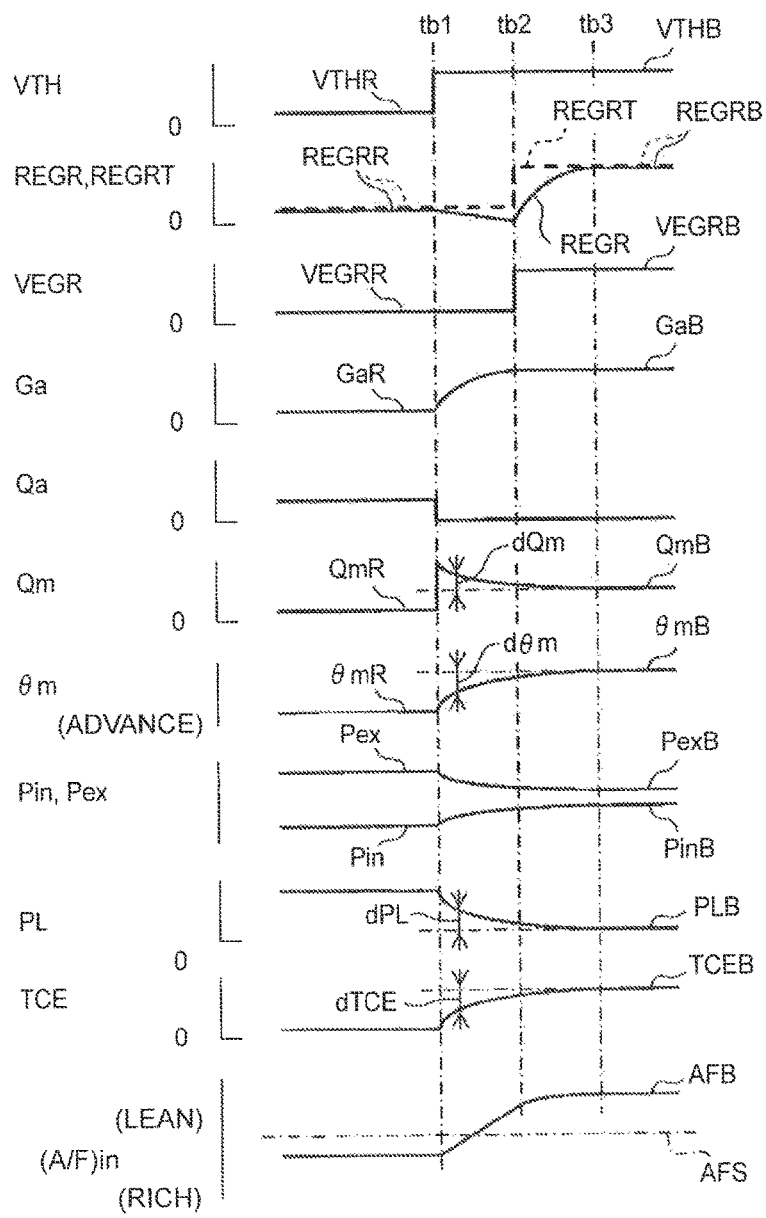
FIG. 17 is a time chart showing a time when the rich control is terminated.

FIG. 17 is a time chart showing a time when the rich control is terminated in the internal combustion engine that is illustrated in FIG. 1.

Once a signal for the termination of the rich control is issued at time tb1, the throttle opening degree VTH is returned from the throttle opening degree VTHR for the rich control to the base throttle opening degree VTHB. As a result, the suctioned air amount Ga gradually increases.

In contrast, at time tb1, the EGR control valve opening degree VEGR is maintained at the EGR control valve opening degree VEGRR for the rich control regardless of the target EGR rate REGRT or the EGR rate REGR. As a result, the EGR rate REGR does not return to the base EGR rate REGRB and declines with the increase in the suctioned air amount Ga. In the example that is illustrated in FIG. 17, the target EGR rate REGRT is maintained at the EGR rate REGRR for the rich control.

When the throttle opening degree VTH and the target EGR rate REGRT or the EGR control valve opening degree VEGR are returned at the same time, not only the suctioned air but also the EGR gas is introduced into the cylinder, and thus the suctioned air amount Ga becomes less likely to increase in a prompt manner and the risk of the occurrence of a misfire increases. In this regard, the throttle opening degree VTH is returned first. As a result, the suctioned air amount Ga increases in a prompt manner and the risk of the occurrence of the misfire is reduced.

In addition, the injection of the additional fuel Qa is stopped at time tb1. As a result, the air-fuel ratio (A/F)in of the exhaust gas gradually increases.

As a result, the intake pressure Pin gradually rises and the exhaust pressure Pex gradually declines. Accordingly, the pump loss PL gradually declines. In other words, the pump loss PL does not return immediately. As a result, the engine output temporarily declines immediately after the termination of the rich control, and an engine output fluctuation might increase. In the example that is illustrated in FIG. 17, the main fuel amount Qm is increased by an increment dQm with respect to the base main fuel amount QmB. As a result, an increase in the engine output fluctuation immediately after the termination of the rich control is blocked.

Figure 26:
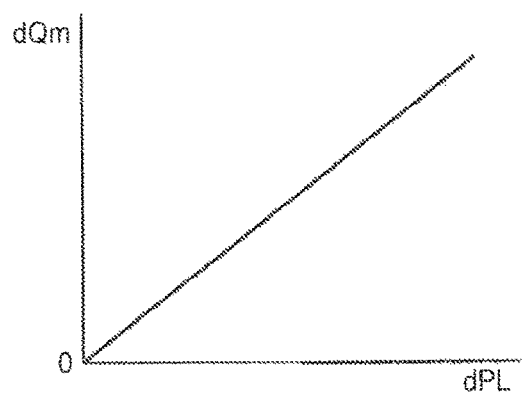
FIG. 26 is a drawing illustrating a map of a main fuel increment dQm.

The increment dQm is set based on a deviation dPL of the pump loss PL with respect to the base pump loss PLB (=PL−PLB). Specifically, the increment dQm is set to decrease as the deviation dPL decreases. The increment dQm is stored in advance in the ROM 32 in the form of the map which is illustrated in FIG. 26. The deviation dPL gradually decreases, and thus the increment dQm gradually decreases.

In addition, the compression end temperature TCE gradually rises. In other words, the compression end temperature TCE does not return immediately. As a result, a delay of the ignition of the main fuel Qm temporarily increases. Accordingly, the engine output temporarily declines and the engine output fluctuation might increase. In the example that is illustrated in FIG. 17, the main fuel injection timing θm is advanced by an advance amount dθm with respect to the base main fuel injection timing θmB. As a result, the timing of the combustion of the main fuel Qm is advanced, and the increase in the engine output fluctuation immediately after the termination of the rich control is blocked.

Figure 27:
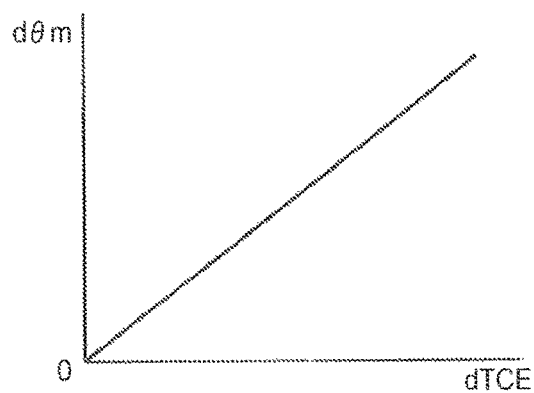
FIG. 27 is a drawing illustrating a map of an advance amount dθm of the main fuel injection timing.

The advance amount dθm is set in accordance with a deviation dTCE of the compression end temperature TCE with respect to the base compression end temperature TCEB (=TCEB−TCE). Specifically, the advance amount dθm is set to decrease as the deviation dTCE decreases. The deviation dθm is stored in advance in the ROM 32 in the form of the map which is illustrated in FIG. 27. The deviation dθm gradually decreases, and thus the advance amount dθm gradually decreases. The compression end temperature TCE can be represented by the intake pressure Pin that represents the in-cylinder gas amount.

Once the suctioned air amount Ga is returned at the subsequent time tb2 to the base suctioned air amount GaB that is determined in accordance with the base throttle opening degree VTHB, the target EGR rate REGRT is returned to the base EGR rate REGRB. In this case, the EGR control valve opening degree VEGR is controlled such that the EGR rate REGR corresponds to the target EGR rate REGRT. Accordingly, the EGR control valve opening degree VEGR is returned to the base EGR control valve opening degree VEGRB. As a result, the EGR rate REGR gradually increases. At this time, the combustion chambers 2 are supplied with an adequate amount of air and free from the risk of the misfire.

Then, at time tb3, the EGR rate REGR is returned to the base EGR rate REGRB.

In addition, at time tb3, the intake pressure Pin is returned to the base intake pressure PinB and the exhaust pressure Pex is returned to the base exhaust pressure PexB, and thus the pump loss PL is returned to the base pump loss PLB. As a result, the increment dQm of the main fuel Qm becomes zero. In other words, the main fuel amount Qm is returned to the base main fuel amount QmB.

Furthermore, at time tb3, the compression end temperature TCE is returned to the base compression end temperature TCEB. As a result, the advance amount dθm of the main fuel injection timing becomes zero. In other words, the main fuel injection timing θm is returned to the base main fuel injection timing θmB.

Moreover, at time tb3, the air-fuel ratio (A/F)in of the exhaust gas is returned to the base air-fuel ratio AFB.

The rich control is terminated in this manner, and the normal control is initiated.

As described above, in the example that is illustrated in FIG. 17, the EGR control valve opening degree VEGR is maintained at the EGR control valve opening degree VEGRR for the rich control from time tb1 to time tb2, that is, from the time when the throttle opening degree VTH is returned to the base throttle opening degree VTHB until the EGR control valve opening degree VEGR is controlled for the EGR rate REGR to be returned to the base EGR rate REGRB. In this case, the EGR rate REGR temporarily deviates from the target EGR rate REGRT. In another example, the EGR control valve opening degree VEGR is controlled such that the EGR rate REGR is maintained at the EGR rate REGRR for the rich control, which is a target EGR rate, from time tb1 to time tb2. In this case, the EGR control valve opening degree VEGR increases with an increase in the suctioned air amount Ga.

In addition, from time tb1 to time tb3, the amount of the main fuel Qm temporarily increases with respect to the base main fuel amount QmB and the main fuel injection timing θm is temporarily advanced with respect to the base main fuel injection timing θmB.

In the example that is illustrated in FIG. 17, the EGR rate REGRR for the rich control is set to exceed zero. In another example, the EGR rate REGRR for the rich control is set to zero. In other words, the supply of the EGR gas is stopped during the rich control.

Figure 28:
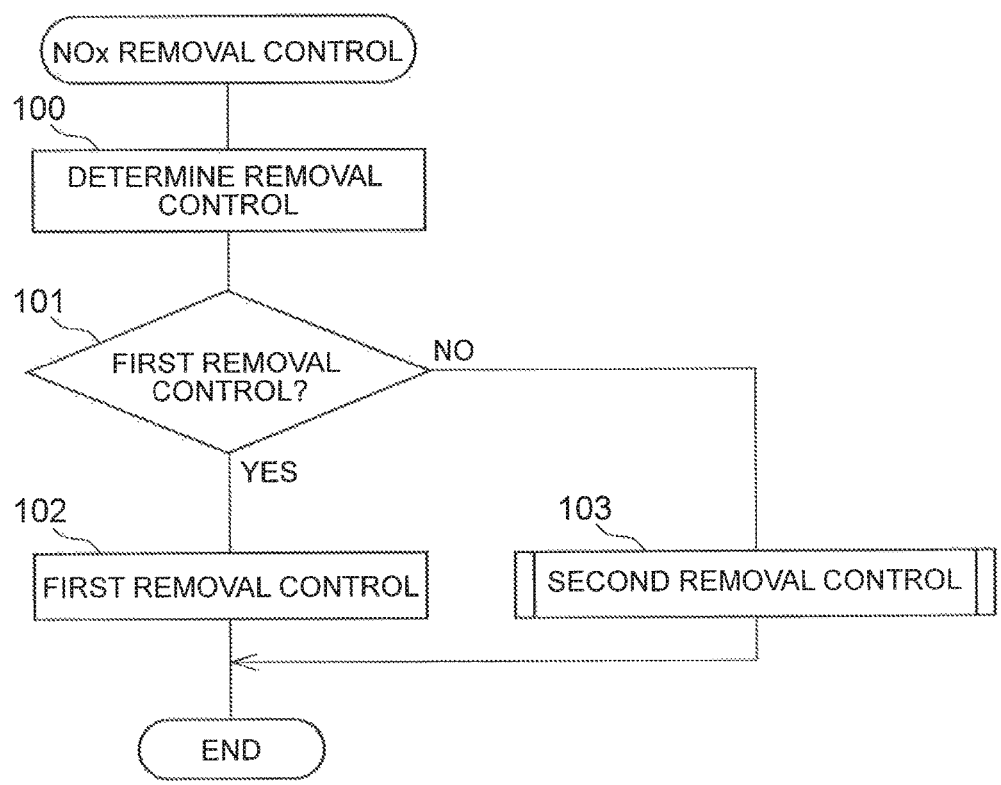
FIG. 28 is a flowchart for executing a NOx removal control.

FIG. 28 shows a routine for executing a NOx removal control according to the example of the invention. This routine is executed by interruption at regular time intervals.

Referring to FIG. 28, whether to perform the NOx removal action according to the first NOx removal control or the NOx removal action according to the second NOx removal control is determined first in Step 100. Then, in Step 101, it is determined whether or not the NOx removal action according to the first NOx removal control should be performed. When the NOx removal action according to the first NOx removal control should be performed, the processing proceeds to Step 102 and the NOx removal action according to the first NOx removal control is performed. In other words, the hydrocarbons are injected from the hydrocarbon supply valve 15, by the injection quantity W illustrated in FIG. 11, at the injection cycle ΔT determined in advance in accordance with the operation states of the engine.

When it is determined in Step 101 that the NOx removal action according to the second NOx removal control should be performed, the processing proceeds to Step 103 and a routine for executing the NOx removal action according to the second NOx removal control is executed. This routine is illustrated in FIG. 29.

Figure 29:
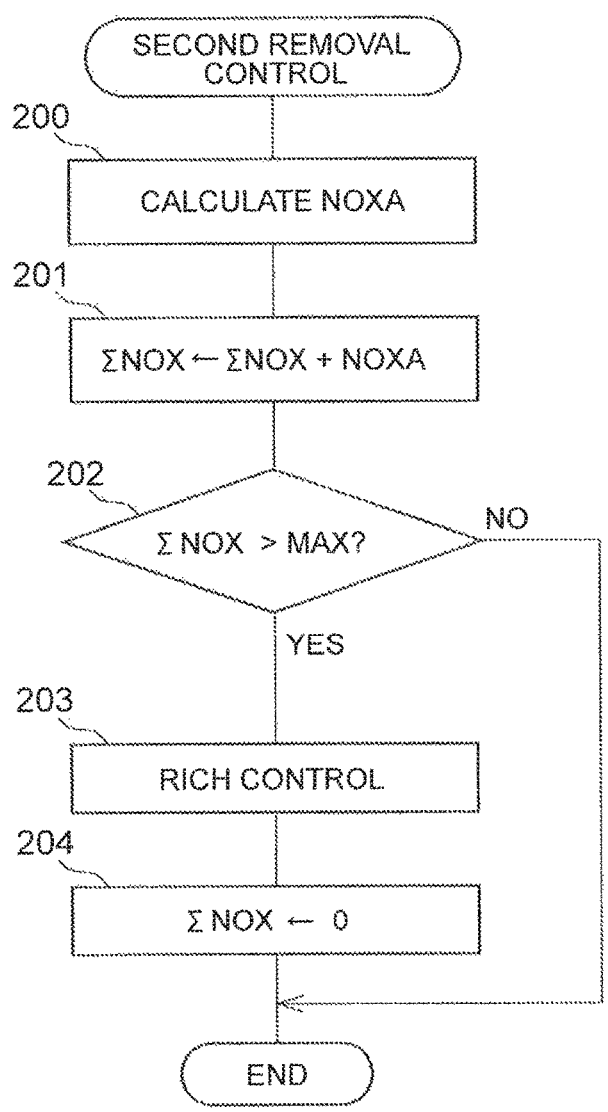
FIG. 29 is a flowchart for executing a NOx removal action according to a second NOx removal control.

FIG. 29 shows the routine for executing the NOx removal action according to the second NOx removal control. This routine is executed in Step 103 in FIG. 28.

Referring to FIG. 29, in Step 200, the discharged NOx amount NOXA per unit time is calculated first from the map which is illustrated in FIG. 13. Then, in Step 201, the stored NOx amount ΣNOX is calculated by the discharged NOx amount NOXA being integrated (ΣNOX=ΣNOX+NOXA). Then, in Step 202, it is determined whether or not the stored NOx amount ΣNOX exceeds the allowable value MAX. The processing cycle is terminated when the ΣNOX is equal to or smaller than the MAX.

Figure 30:
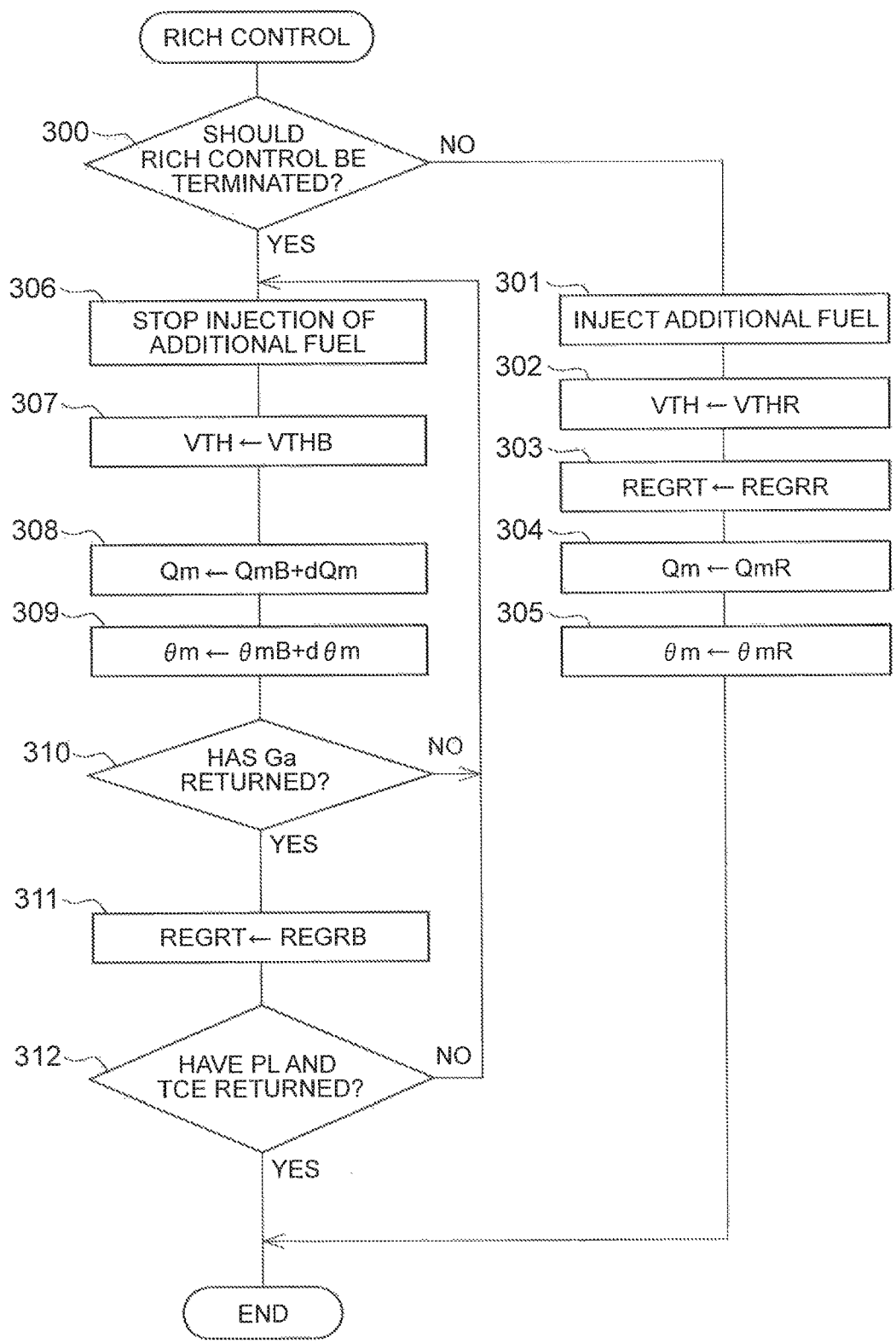
FIG. 30 is a flowchart for executing the rich control.

Once the ΣNOX exceeds the MAX, the processing proceeds to Step 203 from Step 202 and a routine for executing the rich control is executed. This routine is illustrated in FIG. 30. Then, in Step 204, the stored NOx amount ΣNOX is cleared.

FIG. 30 shows the routine for executing the rich control. This routine is executed in Step 203 in FIG. 29.

Referring to FIG. 30, in Step 300, it is first determined whether or not the rich control should be terminated. When the processing has proceeded to Step 300 for the first time, the processing proceeds to Step 301 and the additional fuel Qa is injected. Then, in Step 302, the throttle opening degree VTHR for the rich control is calculated from the map in FIG. 22 and the throttle opening degree VTH is set to the throttle opening degree VTHR for the rich control. Then, in Step 303, the EGR rate REGRR for the rich control is calculated from the map in FIG. 23 and the target EGR rate REGRT is set to the EGR rate REGRR for the rich control. Then, in Step 304, the main fuel amount QmR for the rich control is calculated from the map in FIG. 24 and the main fuel amount Qm is set to the main fuel amount QmR for the rich control. Then, in Step 305, the main fuel injection timing θmR for the rich control is calculated from the map in FIG. 25 and the main fuel injection timing θm is set to the main fuel injection timing θmR for the rich control.

After the rich control is performed for a certain period of time, for example, it is determined that the rich control should be terminated. When it is determined that the rich control should be terminated, the processing proceeds to Step 306 from Step 300 and the injection of the additional fuel Qa is stopped. Then, in Step 307, the base throttle opening degree VTHB is calculated from the map in FIG. 18 and the throttle opening degree VTH is set to the base throttle opening degree VTHB. Then, in Step 308, the base main fuel amount QmB is calculated from the map in FIG. 20, the increment dQm is calculated from the map in FIG. 26, and the main fuel amount Qm is calculated (Qm=QmB+dQm). Then, in Step 309, the base main fuel injection timing θmB is calculated from the map in FIG. 21, the advance amount dθm is calculated from the map in FIG. 27, and the main fuel injection timing θm is calculated (θm=θmB+dθm).

Then, in Step 310, it is determined whether or not the suctioned air amount Ga has returned to the base suctioned air amount GaB. The processing returns to Step 306 when the suctioned air amount Ga has yet to return to the base suctioned air amount GaB. When the suctioned air amount Ga has returned to the base suctioned air amount GaB, the processing proceeds to Step 311 from Step 310, and the base EGR rate REGRB is calculated from the map in FIG. 19 and the target EGR rate REGRT is set to the base EGR rate REGRB. Then, in Step 312, it is determined whether or not the pump loss PL and the compression end temperature TCE have returned to the base pump loss PLB and the base compression end temperature TCEB, respectively. The processing returns to Step 306 when the pump loss PL and the compression end temperature TCE have yet to return to the base pump loss PLB and the base compression end temperature TCEB, respectively. The processing cycle is terminated when the pump loss PL and the compression end temperature TCE have returned to the base pump loss PLB and the base compression end temperature TCEB, respectively.

Hereinafter, another example of the invention will be described.

As described above, in the example that is illustrated in FIG. 17, the target EGR rate REGRT or the EGR control valve opening degree VEGR is returned after the throttle opening degree VTH is returned first. This is because not only the suctioned air but also the EGR gas is introduced into the cylinder when the throttle opening degree VTH and the target EGR rate REGRT or the EGR control valve opening degree VEGR are returned at the same time and this causes the suctioned air amount Ga to become less likely to increase in a prompt manner and the risk of the occurrence of the misfire to increase.

Then, when the base EGR rate REGRB to which the EGR rate REGR is to be returned when the rich control is terminated is low, the risk of the occurrence of the misfire is low even if the throttle opening degree VTH and the target EGR rate REGRT or the EGR control valve opening degree VEGR are returned at the same time. Rather, the intake pressure Pin, the exhaust pressure Pex, the pump loss PL, and the compression end temperature TCE are returned in a prompt manner, and thus the period in which the amount of the main fuel Qm is increased and the period in which the main fuel injection timing θm is advanced are shortened. In other words, switching from the rich control to the normal control is performed in a prompt manner.

In another example of the invention, the EGR control valve opening degree VEGR is controlled, such that the throttle opening degree VTH is returned to the base throttle opening degree VTHB and the EGR rate REGR is returned to the base EGR rate REGRB, when the base EGR rate REGRB to which the EGR rate REGR is to be returned when the rich control is terminated is lower than a limit rate REGRX. As a result, the switching from the rich control to the normal control can be performed in a prompt manner while the risk of the occurrence of the misfire is reduced.

When the base EGR rate REGRB to which the EGR rate REGR is to be returned when the rich control is terminated is higher than the limit rate REGRX, the target EGR rate REGRT or the EGR control valve opening degree VEGR is returned after the throttle opening degree VTH is returned first as in the example that is illustrated in FIG. 17.

Figure 31:
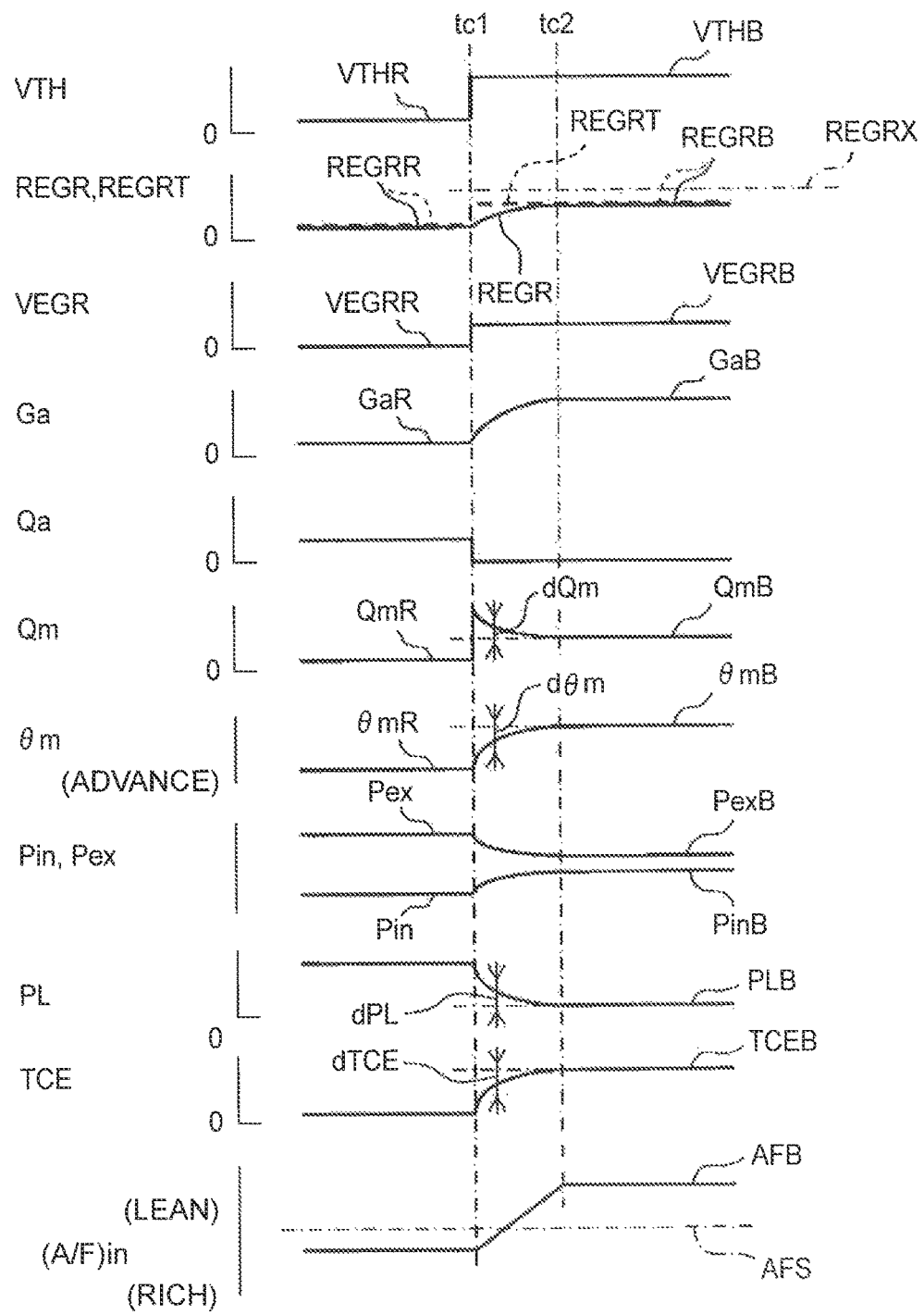
FIG. 31 is a time chart showing a time when the rich control according to another example of the invention is terminated.

FIG. 31 is a time chart showing a time when the rich control is terminated in another example of the invention. FIG. 31 shows a case where the base EGR rate REGRB to which the EGR rate REGR is to be returned when the rich control is terminated is lower than the limit rate REGRX.

Once the signal for the termination of the rich control is issued at time tc1, the throttle opening degree VTH is returned from the throttle opening degree VTHR for the rich control to the base throttle opening degree VTHB. As a result, the suctioned air amount Ga gradually increases. In addition, the target EGR rate REGRT is returned to the base EGR rate REGRB. In this case, the EGR control valve opening degree VEGR is controlled such that the EGR rate REGR corresponds to the target EGR rate REGRT. Accordingly, the EGR control valve opening degree VEGR is returned to the base EGR control valve opening degree VEGRB. As a result, the EGR rate REGR gradually increases.

In addition, at time tc1, the injection of the additional fuel Qa is stopped. As a result, the air-fuel ratio (A/F)in of the exhaust gas gradually increases.

Furthermore, at time tc1, the main fuel Qm is increased by the increment dQm with respect to the base main fuel amount QmB.

Moreover, at time tc1 the main fuel injection timing θm is advanced by the advance amount dθm with respect to the base main fuel injection timing θmB.

Then, at time tc2, the suctioned air amount Ga is returned to the base suctioned air amount GaB that is determined in accordance with the base throttle opening degree VTHB.

In addition, at time tc2, the EGR rate REGR is returned to the base EGR rate REGRB.

Furthermore, at time tc2, the intake pressure Pin is returned to the base intake pressure PinB and the exhaust pressure Pex is returned to the base exhaust pressure PexB, and thus the pump loss PL is returned to the base pump loss PLB. As a result, the increment dQm of the main fuel Qm becomes zero. In other words, the main fuel amount Qm is returned to the base main fuel amount QmB.

Furthermore, at time tc2, the compression end temperature TCE is returned to the base compression end temperature TCEB. As a result, the advance amount dθm of the main fuel injection timing becomes zero. In other words, the main fuel injection timing θm is returned to the base main fuel injection timing θmB.

Moreover, at time tc2, the air-fuel ratio (A/F)in of the exhaust gas is returned to the base air-fuel ratio AFB.

The base EGR rate REGRB to which the EGR rate REGR is to be returned when the rich control is terminated is determined in accordance with the engine operation states at that point in time. Accordingly, the base EGR rate REGRB to which the EGR rate REGR is to be returned when the rich control is terminated is higher than the EGR rate REGRR for the rich control in some cases and is lower than the EGR rate REGRR for the rich control in the other cases as illustrated in FIGS. 17 and 31.

Figure 32:
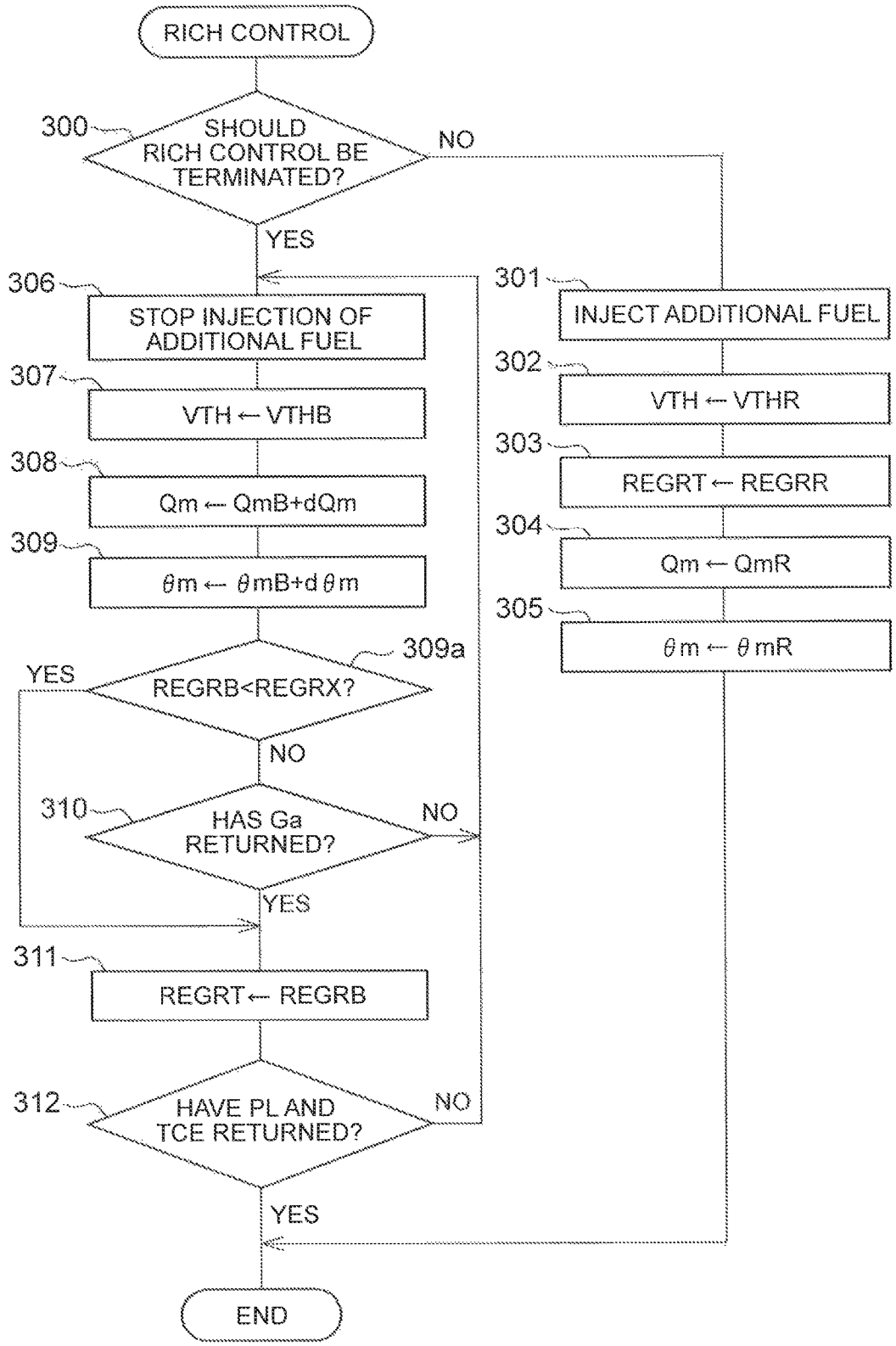
FIG. 32 is a flowchart for executing the rich control according to another example of the invention.

FIG. 32 shows a routine for executing the rich control according to the example that is illustrated in FIG. 31. This routine is executed in Step 203 in FIG. 29.

FIG. 32 differs from the routine that is illustrated in FIG. 30 in the following aspects. In other words, the processing proceeds to Step 309a from Step 309, and the base EGR rate REGRB is calculated from the map in FIG. 19 and it is determined whether or not the base EGR rate REGRB is lower than the limit rate REGRX. The processing jumps to Step 311 when the REGRB is lower than the REGRX, and then the target EGR rate REGRT is set to the base EGR rate REGRB. Accordingly, the throttle opening degree VTH and the target EGR rate REGRT or the EGR control valve opening degree VEGR are returned at the same time. In contrast, the processing proceeds to Step 310 when the REGRB is equal to or higher than the REGRX. Accordingly, the throttle opening degree VTH is returned first, and then the target EGR rate REGRT or the EGR control valve opening degree VEGR is returned at the same time.

The other configurations and effects of the example that is illustrated in FIG. 31 are similar to those of the example that is illustrated in FIG. 17, and thus description thereof will be omitted.

Hereinafter, yet another example of the invention will be described.

When the rich control is performed, the temperature of the exhaust gas that is discharged from the combustion chambers 2 is quite high. Accordingly, if the EGR rate REGR is increased when the rich control is terminated, a large amount of the high-temperature exhaust gas might flow into the EGR passage 16, and the EGR passage 16 or the EGR control valve 17 might be impaired by heat.

In this regard, in yet another example of the invention, the EGR control valve opening degree VEGR is controlled, such that the EGR rate REGR is returned to the base EGR rate REGRB, when the temperature TEGR of the EGR gas to be introduced into the EGR passage 16 has declined to a temperature lower than a threshold temperature TEGRX after the throttle opening degree VTH is returned to the base throttle opening degree VTHB. As a result, the introduction of the high-temperature EGR gas into the EGR passage 16 is blocked, and thus the durability of the EGR passage 16 and the EGR control valve 17 is enhanced. The temperature TEGR of the EGR gas to be introduced into the EGR passage 16 is detected by the temperature sensor 5t (FIG. 1).

Figure 33:
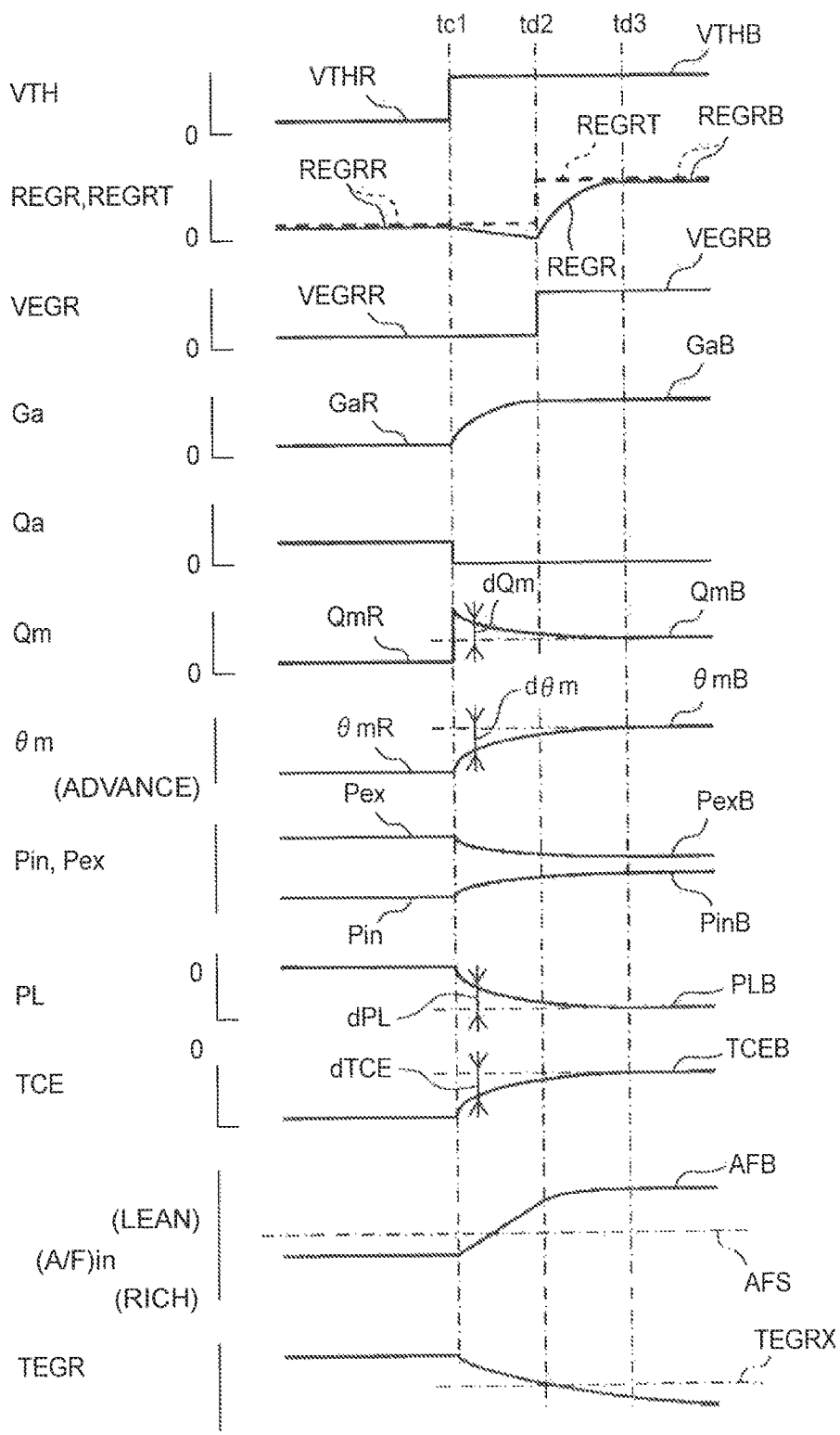
FIG. 33 is a time chart showing a time when the rich control according to yet another example of the invention is terminated.

FIG. 33 is a time chart showing a time when the rich control is terminated in yet another example of the invention.

Once the signal for the termination of the rich control is issued at time td1, the throttle opening degree VTH is returned from the throttle opening degree VTHR for the rich control to the base throttle opening degree VTHB. As a result, the suctioned air amount Ga gradually increases.

In addition, the injection of the additional fuel Qa is stopped. As a result, the air-fuel ratio (A/F)in of the exhaust gas gradually increases. Furthermore, the temperature TEGR of the EGR gas to be introduced into the EGR passage 16 gradually declines.

Then, the target EGR rate REGRT is returned to the base EGR rate REGRB once the temperature TEGR of the EGR gas to be introduced into the EGR passage 16 becomes lower than the threshold temperature TEGRX at time td2. In this case, the EGR control valve opening degree VEGR is controlled such that the EGR rate REGR corresponds to the target EGR rate REGRT. Accordingly, the EGR control valve opening degree VEGR is returned to the base EGR control valve opening degree VEGRB. As a result, the EGR rate REGR gradually increases.

Figure 34:
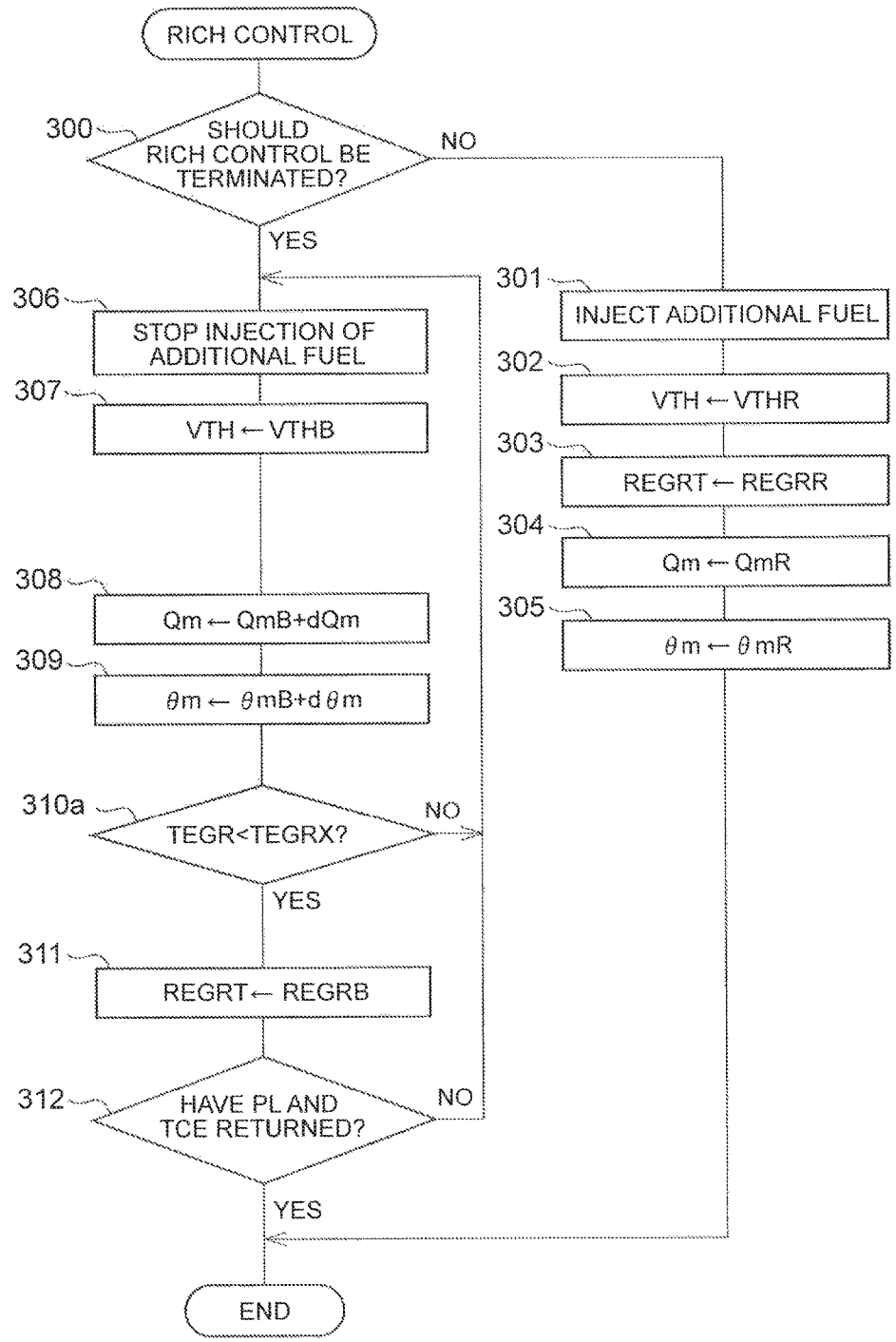
FIG. 34 is a flowchart for executing the rich control according to yet another example of the invention.

FIG. 34 shows a routine for executing the rich control according to the example that is illustrated in FIG. 33. This routine is executed in Step 203 in FIG. 29.

The routine that is illustrated in FIG. 34 differs from the routine that is illustrated in FIG. 30 in the following aspects. In other words, the processing proceeds to Step 310a from Step 309, and it is determined whether or not the temperature TEGR of the EGR gas to be introduced into the EGR passage 16 is lower than the threshold temperature TEGRX. The processing returns to Step 306 when the TEGR is equal to or higher than the TEGRX. In contrast, the processing proceeds to Step 311 when the TEGRX is higher than the TEGR.

The other configurations and effects of the example that is illustrated in FIG. 33 are similar to those of the example that is illustrated in FIG. 17, and thus description thereof will be omitted.

Figure 35:
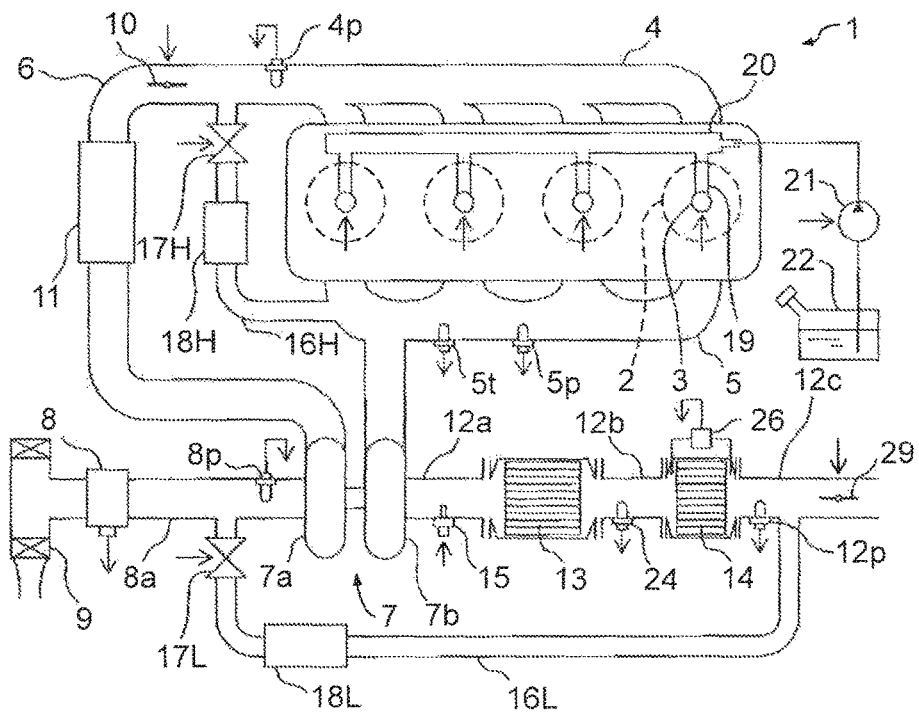
FIG. 35 is an overall view of a compression ignition-type internal combustion engine according to yet another example of the invention.

FIG. 35 shows yet another example of the invention.

Referring to FIG. 35, the exhaust manifold 5 on the upstream side of the exhaust turbine 7b and the intake manifold 4 on the downstream side of the throttle valve 10 are connected to each other via a high pressure side EGR passage 16H, and an electrically controlled high pressure side EGR control valve 17H is disposed in the high pressure side EGR passage 16H. In addition, a cooling device 18H for cooling the EGR gas flowing through the high pressure side EGR passage 16H is disposed around the high pressure side EGR passage 16H.

Furthermore, an exhaust throttle valve 29 is disposed in the exhaust pipe 12c. The exhaust pipe 12c on the upstream side of the exhaust throttle valve 29 and the intake air introduction pipe 8a on the downstream side of the suctioned air amount detector 8 are connected to each other via a low pressure side EGR passage 16L, and an electrically controlled low pressure side EGR control valve 17L is disposed in the low pressure side EGR passage 16L. Moreover, a cooling device 18L for cooling the EGR gas flowing through the low pressure side EGR passage 16L is disposed around the low pressure side EGR passage 16L. In another example, the exhaust throttle valve is omitted.

A pressure sensor 8p for detecting a pressure in the intake air introduction pipe 8a is attached to the intake air introduction pipe 8a on the downstream side of the suctioned air amount detector 8, and a pressure sensor 12p for detecting a pressure in the exhaust pipe 12c is attached to the exhaust pipe 12c on the upstream side of the exhaust throttle valve 29.

Representing the amount of the EGR gas that is supplied from the high pressure side EGR passage 16H to the combustion chambers 2 by GeH and representing the amount of the EGR gas that is supplied from the low pressure side EGR passage 16L to the combustion chambers 2 by GeL, a high pressure side EGR rate REGRH that is the EGR rate regarding the EGR gas from the high pressure side EGR passage 16H is represented by GeH/G and a low pressure side EGR rate REGRL that is the EGR rate regarding the EGR gas from the low pressure side EGR passage 16L is represented by GeL/G The total amount Ge of the EGR gas that is supplied into the combustion chambers 2 is represented by GeH+GeL, and thus the EGR rate REGR is represented by Ge/G.

The amount GeH of the EGR gas from the high pressure side EGR passage 16H is calculated based on the intake pressure that is detected by the pressure sensor 4p, the exhaust pressure that is detected by the pressure sensor 5p, and the opening degree of the high pressure side EGR control valve 17H. The amount GeL of the EGR gas from the low pressure side EGR passage 16L is calculated based on the pressure that is detected by the pressure sensor 8p, a pressure that is detected by a pressure sensor 12p, and the opening degree of the low pressure side EGR control valve 17L. Accordingly, the high pressure side EGR rate REGRH and the low pressure side EGR rate REGRL are calculated.

In the example that is illustrated in FIG. 35, the actual high pressure side EGR rate REGRH is calculated, the opening degree of the high pressure side EGR control valve 17H is controlled such that the actual high pressure side EGR rate REGRH corresponds to a target high pressure side EGR rate REGRHT, the actual low pressure side EGR rate REGRL is calculated, and the opening degree of the low pressure side EGR control valve 17L and the opening degree of the exhaust throttle valve 29 are controlled such that the actual low pressure side EGR rate REGRL corresponds to a target low pressure side EGR rate REGRLT.

Figure 36:
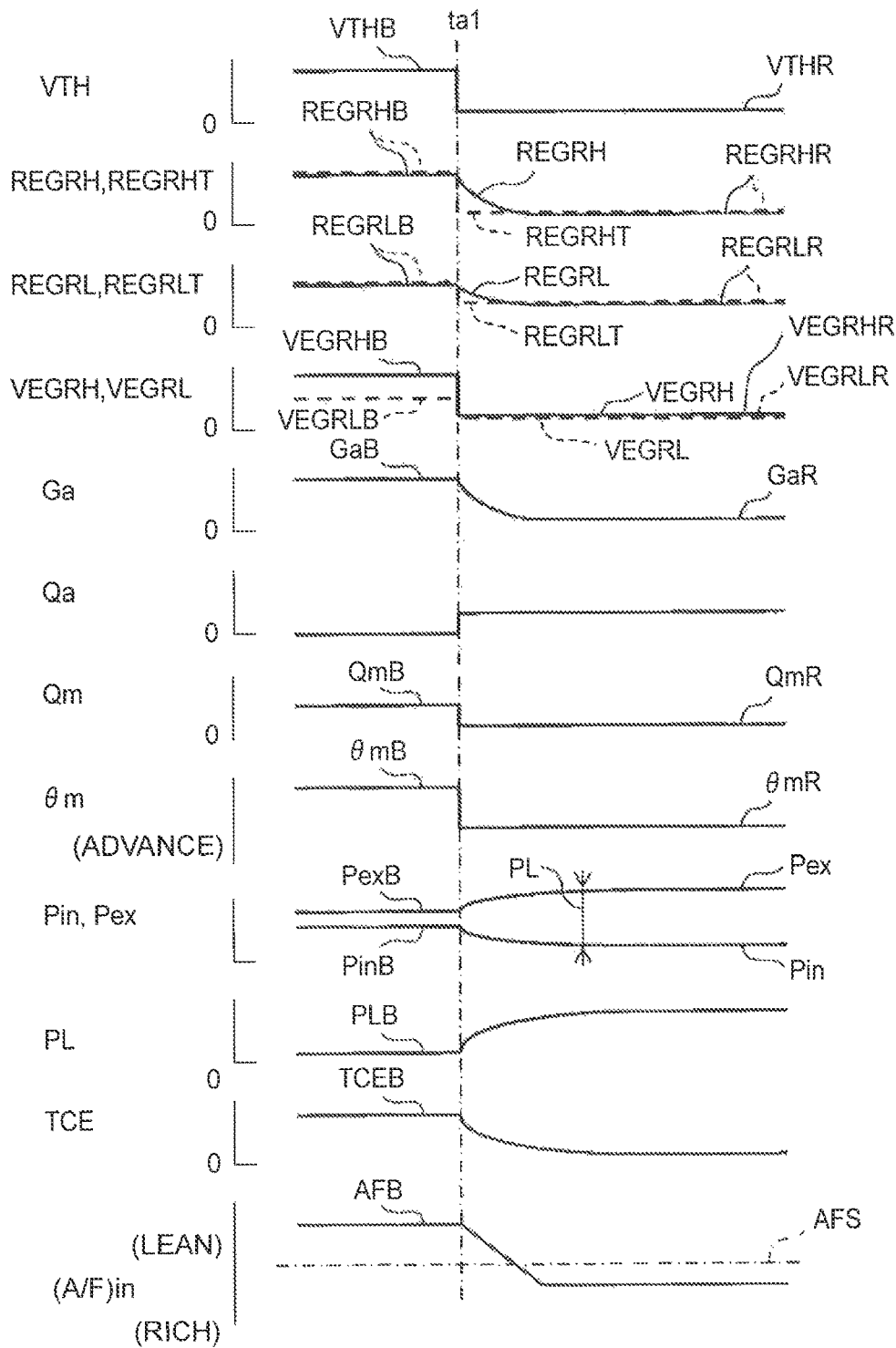
FIG. 36 is a time chart showing a time when the rich control according to yet another example of the invention is initiated.

FIG. 36 is a time chart showing a time when the rich control is initiated in the internal combustion engine that is illustrated in FIG. 35. Time te1 in FIG. 36 represents a timing at which the signal is issued for the initiation of the rich control. Before time te1, that is, during the normal control in which the rich control is not performed, the throttle opening degree VTH is set to the base throttle opening degree VTHB. As a result, the suctioned air amount Ga becomes the base suctioned air amount GaB that is determined in accordance with the base throttle opening degree VTHB.

In addition, the target high pressure side EGR rate REGRHT and the target low pressure side EGR rate REGRLT are set to a base high pressure side EGR rate REGRHB and a base low pressure side EGR rate REGRLB, respectively. In other words, a high pressure side EGR control valve opening degree VEGRH becomes a base high pressure side EGR control valve opening degree VEGRHB that is required for the actual high pressure side EGR rate REGRH to become the base high pressure side EGR rate REGRHB, and a low pressure side EGR control valve opening degree VEGRL becomes a base low pressure side EGR control valve opening degree VEGRLB that is required for the actual low pressure side EGR rate REGRL to become the base low pressure side EGR rate REGRLB. As a result, the high pressure side EGR rate REGRH and the low pressure side EGR rate REGRL become the base high pressure side EGR rate REGRHB and the base low pressure side EGR rate REGRLB, respectively. The base high pressure side EGR rate REGRHB and the base low pressure side EGR rate REGRLB are stored in advance in the ROM 32 as the function of the depression amount L of the accelerator pedal 40 and the engine rotation speed N and in the form of the maps which are illustrated in FIGS. 38 and 39, respectively.

Furthermore, the additional fuel amount Qa is set to zero. In other words, the additional fuel Qa is not injected. As a result, the air-fuel ratio (A/F)in of the exhaust gas becomes the base air-fuel ratio AFB that is leaner than the stoichiometric air-fuel ratio AFS.

Moreover, the main fuel Qm is set to the base main fuel amount QmB.

Moreover, the main fuel injection timing θm is set to the base injection timing θmB.

In this case, the intake pressure Pin becomes the base intake pressure PinB and the exhaust pressure Pex becomes the base exhaust pressure PexB. Accordingly, the pump loss PL (=Pex−Pin) becomes the base pump loss PLB (=PexB−PinB).

The compression end temperature TCE becomes the base compression end temperature TCEB.

Once the signal for the initiation of the rich control is issued at time te1, the throttle opening degree VTH is switched from the base throttle opening degree VTHB to the throttle opening degree VTHR for the rich control. In the example that is illustrated in FIG. 36, the throttle opening degree VTH is lowered. As a result, the suctioned air amount Ga decreases to the suctioned air amount GaR for the rich control.

In addition, the target high pressure side EGR rate REGRHT and the target low pressure side EGR rate REGRLT are switched from the base high pressure side EGR rate REGRHB and the base low pressure side EGR rate REGRLB to a high pressure side EGR rate REGRHR for the rich control and a low pressure side EGR rate REGRLR for the rich control that are different from the base high pressure side EGR rate REGRHB and the base low pressure side EGR rate REGRLB, respectively. Then, the high pressure side EGR control valve opening degree VEGRH and the low pressure side EGR control valve opening degree VEGRL are switched from the base high pressure side EGR control valve opening degree VEGRH and the base low pressure side EGR control valve opening degree VEGRL to a high pressure side EGR control valve opening degree VEGRHR for the rich control and a low pressure side EGR control valve opening degree VEGRLR for the rich control that are different from the base high pressure side EGR control valve opening degree VEGRH and the base low pressure side EGR control valve opening degree VEGRL, respectively. The high pressure side EGR control valve opening degree VEGRHR for the rich control and the low pressure side EGR control valve opening degree VEGRLR for the rich control are a high pressure side EGR control valve opening degree and a low pressure side EGR control valve opening degree that are required for the high pressure side EGR rate REGRH and the low pressure side EGR rate REGRL to become the high pressure side EGR rate REGRHR for the rich control and the low pressure side EGR rate REGRLR for the rich control, respectively. In the example that is illustrated in FIG. 36, the target high pressure side EGR rate REGRHT and the target low pressure side EGR rate REGRLT are lowered, and thus the high pressure side EGR control valve opening degree VEGRH and the low pressure side EGR control valve opening degree VEGRL are lowered, respectively. As a result, the high pressure side EGR rate REGRH and the low pressure side EGR rate REGRL decline to the high pressure side EGR rate REGRHR for the rich control and the low pressure side EGR rate REGRLR for the rich control, respectively. The high pressure side EGR rate REGRHR for the rich control and the low pressure side EGR rate REGRLR for the rich control are stored in advance in the ROM 32 as the function of the depression amount L of the accelerator pedal 40 and the engine rotation speed N and in the form of the maps which are illustrated in FIGS. 40 and 41, respectively.

Furthermore, the injection of the additional fuel Qa is initiated. As a result, the air-fuel ratio (A/F)in of the exhaust gas declines from the base air-fuel ratio AFB. In the example that is illustrated in FIG. 36, the air-fuel ratio (A/F)in of the exhaust gas becomes richer than the stoichiometric air-fuel ratio AFS.

Moreover, the main fuel amount Qm is switched from the base main fuel amount QmB to the main fuel amount QmR for the rich control.

Moreover, the main fuel injection timing θm is switched from the base injection timing θmB to the injection timing θmR for the rich control. In the example that is illustrated in FIG. 36, the main fuel injection timing θm is advanced.

Figure 37:
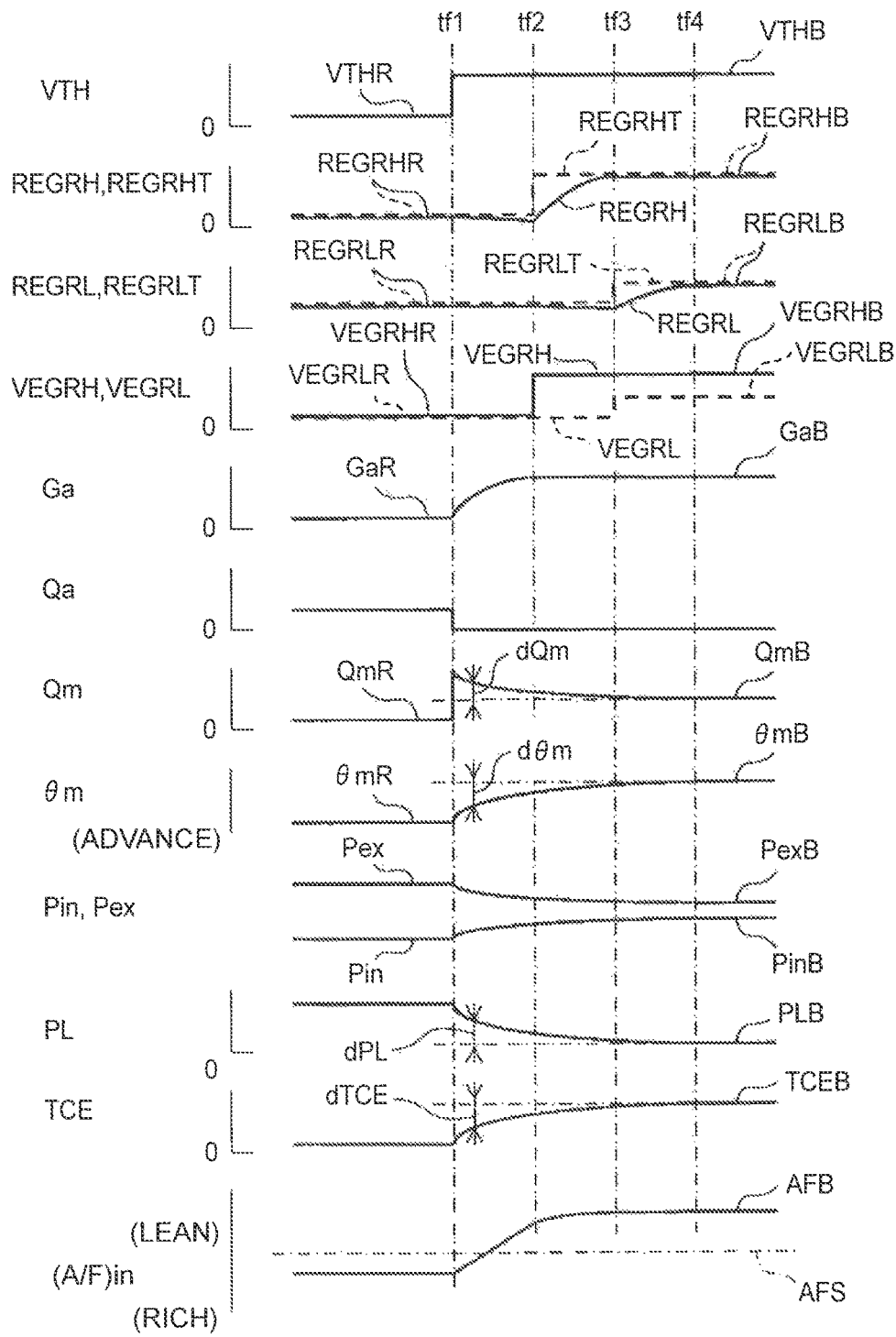
FIG. 37 is a time chart showing a time when the rich control according to yet another example of the invention is terminated.

FIG. 37 is a time chart showing a time when the rich control is terminated in the internal combustion engine that is illustrated in FIG. 35.

Once the signal for the termination of the rich control is issued at time tf1, the throttle opening degree VTH is returned from the throttle opening degree VTHR for the rich control to the base throttle opening degree VTHB. As a result, the suctioned air amount Ga gradually increases.

In contrast, at time tf1, the high pressure side EGR control valve opening degree VEGRH and the low pressure side EGR control valve opening degree VEGRL are maintained at the high pressure side EGR control valve opening degree VEGRHR for the rich control and the low pressure side EGR control valve opening degree VEGRLR for the rich control, respectively. As a result, the high pressure side EGR rate REGRH and the low pressure side EGR rate REGRL do not respectively return to the base high pressure side EGR rate REGRHB and the base low pressure side EGR rate REGRLB, and the high pressure side EGR rate REGRH and the low pressure side EGR rate REGRL decline with the increase in the suctioned air amount Ga. In the example that is illustrated in FIG. 37, the target high pressure side EGR rate REGRHT and the target low pressure side EGR rate REGRLT are maintained at the high pressure side EGR rate REGRHR for the rich control and the low pressure side EGR rate REGRLR for the rich control, respectively. As a result, the suctioned air amount Ga increases in a prompt manner and the risk of the occurrence of the misfire is reduced.

In addition, the injection of the additional fuel Qa is stopped at time tf1. As a result, the air-fuel ratio (A/F)in of the exhaust gas gradually increases.

Furthermore, at time tf1, the main fuel amount Qm is increased by the increment dQm with respect to the base main fuel amount QmB. As a result, the increase in the engine output fluctuation immediately after the termination of the rich control is blocked.

Moreover, at time tf1, the main fuel injection timing θm is advanced by the advance amount dθm with respect to the base main fuel injection timing θmB. As a result, the timing of the combustion of the main fuel Qm is advanced, and the increase in the engine output fluctuation immediately after the termination of the rich control is blocked.

Once the suctioned air amount Ga is returned at the subsequent time tf2 to the base suctioned air amount GaB that is determined in accordance with the base throttle opening degree VTHB, the target high pressure side EGR rate REGRHT is returned to the base high pressure side EGR rate REGRHB. In this case, the high pressure side EGR control valve opening degree VEGRH is controlled such that the high pressure side EGR rate REGRH corresponds to the target high pressure side EGR rate REGRHT. Accordingly, the high pressure side EGR control valve opening degree VEGRH is returned to the base high pressure side EGR control valve opening degree VEGRHB. As a result, the high pressure side EGR rate REGRH gradually increases.

Once the high pressure side EGR rate REGRH is returned to the base high pressure side EGR rate REGRHB at the subsequent time tf3, the target low pressure side EGR rate REGRLT is returned to the base low pressure side EGR rate REGRLB. In this case, the low pressure side EGR control valve opening degree VEGRL is controlled such that the low pressure side EGR rate REGRL corresponds to the target low pressure side EGR rate REGRLT. Accordingly, the low pressure side EGR control valve opening degree VEGRL is returned to the base low pressure side EGR control valve opening degree VEGRLB. As a result, the low pressure side EGR rate REGRL gradually increases.

Then, at time tf4, the low pressure side EGR rate REGRL is returned to the base low pressure side EGR rate REGRLB.

In addition, at time tf4, the intake pressure Pin is returned to the base intake pressure PinB and the exhaust pressure Pex is returned to the base exhaust pressure PexB, and thus the pump loss PL is returned to the base pump loss PLB. As a result, the increment dQm of the main fuel Qm becomes zero. In other words, the main fuel amount Qm is returned to the base main fuel amount QmB.

Furthermore, at time tf4, the compression end temperature TCE is returned to the base compression end temperature TCEB. As a result, the advance amount dθm of the main fuel injection timing becomes zero. In other words, the main fuel injection timing θm is returned to the base main fuel injection timing θmB.

Moreover, at time tf4, the air-fuel ratio (A/F)in of the exhaust gas is returned to the base air-fuel ratio AFB.

The rich control is terminated in this manner, and the normal control is initiated.

In the example that is illustrated in FIG. 37, the target low pressure side EGR rate REGRLT or the low pressure side EGR control valve opening degree VEGRL is returned after the target high pressure side EGR rate REGRHT or the high pressure side EGR control valve opening degree VEGRH is returned first. Then, the suctioned air amount is recovered more promptly than in a case where the high pressure side EGR control valve opening degree VEGRH and the low pressure side EGR control valve opening degree VEGRL are returned at the same time, and thus the risk of the occurrence of the misfire is reduced. In addition, since the high pressure side EGR control valve opening degree VEGRH is returned in advance, the supply of the EGR gas into the combustion chambers 2 is resumed in a prompt manner.

If the low pressure side EGR control valve opening degree VEGRL is returned in advance, the NOx that is released from the exhaust gas control catalyst 13 by the rich control might be stored again after returning to the exhaust gas control catalyst 13 via the low pressure side EGR passage 16L, the exhaust manifold 5, the combustion chambers 2, and then the exhaust manifold 5. The example that is illustrated in FIG. 37 is free from this risk since the high pressure side EGR control valve opening degree VEGRH is returned in advance.

In the example that is illustrated in FIG. 37, each of the high pressure side EGR rate REGRHR for the rich control and the low pressure side EGR rate REGRLR for the rich control is set to exceed zero. In another example, one or both of the high pressure side EGR rate REGRHR for the rich control and the low pressure side EGR rate REGRLR for the rich control are set to zero.

Figure 43:
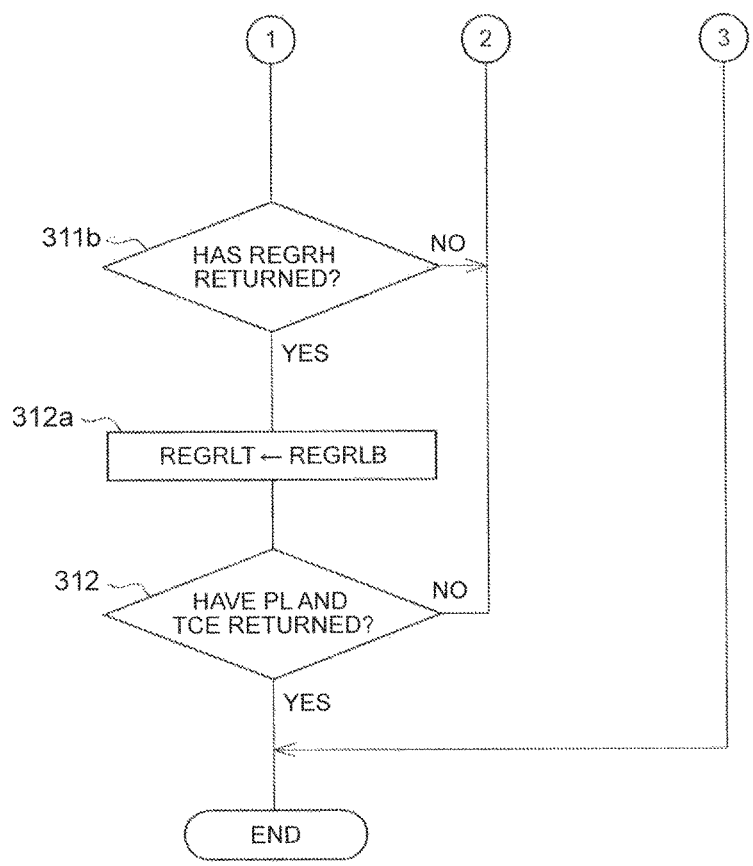
FIG. 43 is a flowchart for executing the rich control according to yet another example of the invention.

FIGS. 42 and 43 show a routine for executing the rich control according to the example that is illustrated in FIGS. 36 and 37. This routine is executed in Step 203 in FIG. 29.

FIG. 34 differs from the routine that is illustrated in FIG. 30 in the following aspects. In other words, the processing proceeds to Step 303a from Step 302, the high pressure side EGR rate REGRHR for the rich control is calculated from the map in FIG. 40, and the target high pressure side EGR rate REGRHT is set to the high pressure side EGR rate REGRHR for the rich control. Then, in Step 303b, the low pressure side EGR rate REGRLR for the rich control is calculated from the map in FIG. 41, and the target low pressure side EGR rate REGRLT is set to the low pressure side EGR rate REGRLR for the rich control. Then, the processing proceeds to Step 304.

After the suctioned air amount Ga is returned to the base suctioned air amount GaB in Step 310, the processing proceeds to Step 311a, the base high pressure side EGR rate REGRHB is calculated from the map in FIG. 38, and the target high pressure side EGR rate REGRHT is set to the base high pressure side EGR rate REGRHB. Then, in Step 311b, it is determined whether or not the high pressure side EGR rate REGRH has been returned to the base high pressure side EGR rate REGRHB. The processing returns to Step 306 when the high pressure side EGR rate REGRH has yet to return to the base high pressure side EGR rate REGRHB. When the high pressure side EGR rate REGRH has returned to the base high pressure side EGR rate REGRHB, the processing proceeds to Step 312a from Step 311b, the base low pressure side EGR rate REGRLB is calculated from the map in FIG. 39, and the target low pressure side EGR rate REGRLT is set to the base low pressure side EGR rate REGRLB. Then, the processing proceeds to Step 312.

The other configurations and effects of the example that is illustrated in FIGS. 36 and 37 are similar to those of the example that is illustrated in FIGS. 16 and 17, and thus description thereof will be omitted.

In the example that is illustrated in FIGS. 36 and 37, the target low pressure side EGR rate REGRLT is set to zero, and thus the EGR gas is supplied to the engine only from the high pressure side EGR passage 16H in some cases. In this case, the example that is illustrated in FIGS. 16 and 17 is applied with the EGR passage 16 and the EGR control valve 17 illustrated in FIG. 1 substituted with the high pressure side EGR passage 16H and the high pressure side EGR control valve 17H illustrated in FIG. 35. Likewise, the target high pressure side EGR rate REGRHT is set to zero, and thus the EGR gas is supplied to the engine only from the low pressure side EGR passage 16L in some cases. In this case, the example that is illustrated in FIGS. 16 and 17 is applied with the EGR passage 16 and the EGR control valve 17 illustrated in FIG. 1 substituted with the low pressure side EGR passage 16L and the low pressure side EGR control valve 17L illustrated in FIG. 35.

In each of the examples of the invention described above, the rich control is performed so that the NOx is released from the exhaust gas control catalyst 13. In another example, the rich control is performed so that SOx is released from the exhaust gas control catalyst 13. During the rich control in this case, the air-fuel ratio (A/F)in of the exhaust gas flowing into the exhaust gas control catalyst 13 is allowed to remain richer than the stoichiometric air-fuel ratio while the temperature of the exhaust gas control catalyst 13 is maintained at or above a SOx release temperature (such as 600° C.). In yet another example, the rich control is performed so that the temperature of the exhaust gas control catalyst 13 is raised. During the rich control in this case, the air-fuel ratio (A/F)in of the exhaust gas flowing into the exhaust gas control catalyst 13 is allowed to remain leaner than the stoichiometric air-fuel ratio.

As another example, an oxidation catalyst for reforming the hydrocarbon can also be disposed in the engine exhaust passage on the upstream side of the exhaust gas control catalyst 13.

REFERENCE SIGNS LIST

2 . . . COMBUSTION CHAMBER, 4 . . . INTAKE MANIFOLD, 5 . . . EXHAUST MANIFOLD, 10 . . . THROTTLE VALVE, 12a, 12b . . . EXHAUST PIPE, 13 . . . EXHAUST GAS CONTROL CATALYST, 15 . . . HYDROCARBON SUPPLY VALVE, 16 . . . EGR PASSAGE, 16H . . . HIGH PRESSURE SIDE EGR PASSAGE, 16L . . . LOW PRESSURE SIDE EGR PASSAGE, 17 . . . EGR CONTROL VALVE, 17H . . . HIGH PRESSURE SIDE EGR CONTROL VALVE, 17L . . . LOW PRESSURE SIDE EGR CONTROL VALVE

The invention claimed is:

1. An exhaust gas control apparatus for an internal combustion engine, the internal combustion engine including an engine intake passage, an engine exhaust passage, an exhaust gas recirculation passage and an exhaust gas recirculation control valve, the engine intake passage being connected with the engine exhaust passage via the exhaust gas recirculation passage, and the exhaust gas recirculation control valve being disposed in the exhaust gas recirculation passage, the exhaust gas recirculation control valve being configured to control an exhaust gas recirculation rate, the exhaust gas control apparatus comprising
an electronic control unit configured to:
perform a rich control for temporarily declining an air-fuel ratio of exhaust gas discharged from an engine combustion chamber by injecting an additional fuel into a cylinder in an expansion stroke or an exhaust stroke when a throttle opening degree is switched from a base throttle opening degree to a throttle opening degree for the rich control and the exhaust gas recirculation rate is switched from a base exhaust gas recirculation rate to an exhaust gas recirculation rate for the rich control,
the exhaust gas being discharged from the engine combustion chamber,
the throttle opening degree being an opening degree of a throttle valve,
the throttle valve being disposed in the intake passage,
the throttle valve being configured to control a suctioned air amount,
the throttle opening degree for the rich control being lower than the base throttle opening degree, and
the exhaust gas recirculation rate for the rich control being different from the base exhaust gas recirculation rate; and
terminate the rich control by controlling an exhaust gas recirculation control valve opening degree such that the exhaust gas recirculation rate is returned to the base exhaust gas recirculation rate, returning the throttle opening degree to the base throttle opening degree, stopping the injection of the additional fuel, and increasing the amount of a main fuel temporarily.

2. The exhaust gas control apparatus for the internal combustion engine according to claim 1,
wherein the electronic control unit is configured to stop increasing the amount of the main fuel when a pump loss is returned to a base pump loss, the base pump loss is determined based on the base throttle opening degree and the base exhaust gas recirculation rate.

3. The exhaust gas control apparatus for the internal combustion engine according to claim 2,
wherein the electronic control unit is configured to set an increment of the main fuel based on a deviation of the pump loss with respect to the base pump loss.

4. The exhaust gas control apparatus for the internal combustion engine according to claim 1,
wherein the electronic control unit is configured to perform the rich control for temporarily declining the air-fuel ratio of the exhaust gas discharged from the engine combustion chamber by injecting the additional fuel into the cylinder in the expansion stroke or the exhaust stroke when the throttle opening degree is switched from the base throttle opening degree to the throttle opening degree for the rich control, the exhaust gas recirculation rate is switched from the base exhaust gas recirculation rate to the exhaust gas recirculation rate for the rich control, and a main fuel injection timing is advanced from a base main fuel injection timing to a main fuel injection timing for the rich control, and
the electronic control unit is configured to terminate the rich control by:
(i) returning the throttle opening degree to the base throttle opening degree, stopping the injection of the additional fuel, and increasing the amount of the main fuel temporarily; then
(ii) controlling the exhaust gas recirculation control valve opening degree such that the exhaust gas recirculation rate is returned to the base exhaust gas recirculation rate; and then
(iii) returning the main fuel injection timing to the base main fuel injection timing.

5. The exhaust gas control apparatus for the internal combustion engine according to claim 4,
wherein the electronic control unit is configured to return the main fuel injection timing to the base main fuel injection timing when a compression end temperature is returned to a base compression end temperature after the exhaust gas recirculation control valve opening degree is controlled,
the electronic control unit is configured to determine the base compression end temperature based on the base throttle opening degree and the base exhaust gas recirculation rate.

6. The exhaust gas control apparatus for the internal combustion engine according to claim 5,
wherein the electronic control unit is configured to advance the main fuel injection timing, by an advance amount, with respect to the base main fuel injection timing until the compression end temperature is returned to the base compression end temperature after the throttle opening degree is returned to the base throttle opening degree, and
the electronic control unit is configured to set the advance amount based on the compression end temperature.

7. The exhaust gas control apparatus for the internal combustion engine according to claim 6,
wherein the electronic control unit is configured to set the advance amount based on a deviation of the compression end temperature with respect to the base compression end temperature.

8. The exhaust gas control apparatus for the internal combustion engine according to claim 1,
wherein when the base exhaust gas recirculation rate to which the exhaust gas recirculation rate is to be returned when the rich control is terminated is lower than a limit rate determined in advance, the electronic control unit is configured to control the exhaust gas recirculation control valve opening degree such that the throttle opening degree is returned to the base throttle opening degree, the injection of the additional fuel is stopped, the amount of the main fuel is temporarily increased, and the exhaust gas recirculation rate is returned to the base exhaust gas recirculation rate, and
when the base exhaust gas recirculation rate to which the exhaust gas recirculation rate is to be returned when the rich control is terminated is higher than the limit rate, the electronic control unit is configured to control the exhaust gas recirculation control valve opening degree such that the exhaust gas recirculation rate is returned to the base exhaust gas recirculation rate after the throttle opening degree is returned to the base throttle opening degree, the injection of the additional fuel is stopped, and the amount of the main fuel is temporarily increased.

9. The exhaust gas control apparatus for the internal combustion engine according to claim 1,
wherein the electronic control unit is configured to control the exhaust gas recirculation control valve opening degree such that the exhaust gas recirculation rate is returned to the base exhaust gas recirculation rate when the suctioned air amount is returned to a base suctioned air amount after the throttle opening degree is returned to the base throttle opening degree,
the electronic control unit is configured to determine the base suctioned air amount based on the base throttle opening degree.

10. The exhaust gas control apparatus for the internal combustion engine according to claim 1,
wherein the electronic control unit is configured to control the exhaust gas recirculation control valve opening degree such that the exhaust gas recirculation rate is returned to the base exhaust gas recirculation rate when a temperature of exhaust gas recirculation gas to be introduced into the exhaust gas recirculation passage has declined to a temperature lower than a threshold temperature after the throttle opening degree is returned to the base throttle opening degree.

11. The exhaust gas control apparatus for the internal combustion engine according to claim 1,
wherein the electronic control unit is configured to maintain the exhaust gas recirculation control valve opening degree until the exhaust gas recirculation control valve opening degree is controlled such that the exhaust gas recirculation rate is returned to the base exhaust gas recirculation rate after the throttle opening degree is returned to the base throttle opening degree.

12. The exhaust gas control apparatus for the internal combustion engine according to claim 1,
wherein the exhaust gas recirculation passage has a high pressure side exhaust gas recirculation passage, the high pressure side exhaust gas recirculation passage connects the engine exhaust passage and the engine intake passage downstream of the throttle valve to each other, and
the exhaust gas recirculation control valve has a high pressure side exhaust gas recirculation control valve, the high pressure side exhaust gas recirculation control valve is disposed in the high pressure side exhaust gas recirculation passage.

13. The exhaust gas control apparatus for the internal combustion engine according to claim 1,
wherein the internal combustion engine further includes an exhaust turbocharger the exhaust turbocharger is configured to drive a compressor with an exhaust turbine, the compressor is disposed in the engine intake passage upstream of the throttle valve, the exhaust turbine is disposed in the engine exhaust passage, the exhaust gas recirculation passage has a low pressure side exhaust gas recirculation passage, the low pressure side exhaust gas recirculation passage connects the engine exhaust passage downstream of the exhaust turbine and the engine intake passage upstream of the compressor to each other, and the exhaust gas recirculation control valve includes a low pressure side exhaust gas recirculation control valve, the low pressure side exhaust gas recirculation control valve is disposed in the low pressure side exhaust gas recirculation passage.

14. The exhaust gas control apparatus for the internal combustion engine according to claim 1, wherein the internal combustion engine further includes an exhaust turbocharger, the exhaust turbocharger is configured to drive a compressor with an exhaust turbine, the compressor is disposed in the engine intake passage upstream of the throttle valve, the exhaust turbine is disposed in the engine exhaust passage, the exhaust gas recirculation passage has a high pressure side exhaust gas recirculation passage and a low pressure side exhaust gas recirculation passage, the high pressure side exhaust gas recirculation passage connects the engine exhaust passage upstream of the exhaust turbine and the engine intake passage downstream of the throttle valve to each other, and the low pressure side exhaust gas recirculation passage connects the engine exhaust passage downstream of the exhaust turbine and the engine intake passage upstream of the compressor to each other, the exhaust gas recirculation control valve includes a high pressure side exhaust gas recirculation control valve and a low pressure side exhaust gas recirculation control valve, the high pressure side exhaust gas recirculation control valve is disposed in the high pressure side exhaust gas recirculation passage and the low pressure side exhaust gas recirculation control valve is disposed in the low pressure side exhaust gas recirculation passage, the electronic control unit is configured to perform the rich control for temporarily declining the air-fuel ratio of the exhaust gas discharged from the engine combustion chamber by injecting the additional fuel into the cylinder in the expansion stroke or the exhaust stroke in a state where:

the throttle opening degree is switched from the base throttle opening degree to the throttle opening degree for the rich control;

a high pressure side exhaust gas recirculation rate is switched from a base high pressure side exhaust gas recirculation rate to a high pressure side exhaust gas recirculation rate for the rich control different from the base high pressure side exhaust gas recirculation rate; and a low pressure side exhaust gas recirculation rate is switched from a base low pressure side exhaust gas recirculation rate to a low pressure side exhaust gas recirculation rate for the rich control different from the base low pressure side exhaust gas recirculation rate, and the electronic control unit is configured to terminate the rich control by:

(i) returning the throttle opening degree to the base throttle opening degree, stopping the injection of the additional fuel, and increasing the amount of the main fuel temporarily; then (ii) controlling a high pressure side exhaust gas recirculation control valve opening degree such that the high pressure side exhaust gas recirculation rate is returned to the base high pressure side exhaust gas recirculation rate; and then (iii) controlling a low pressure side exhaust gas recirculation control valve opening degree such that the low pressure side exhaust gas recirculation rate is returned to the base low pressure side exhaust gas recirculation rate.

15. The exhaust gas control apparatus for the internal combustion engine according to claim 14, wherein the electronic control unit is configured to control the high pressure side exhaust gas recirculation control valve opening degree such that the high pressure side exhaust gas recirculation rate is returned to the base high pressure side exhaust gas recirculation rate when the suctioned air amount is returned to a base suctioned air amount, which is determined in accordance with the base throttle opening degree, after the throttle opening degree is returned to the base throttle opening degree.

16. The exhaust gas control apparatus for the internal combustion engine according to claim 14, wherein the electronic control unit is configured to control the low pressure side exhaust gas recirculation control valve opening degree such that the low pressure side exhaust gas recirculation rate is returned to the base low pressure side exhaust gas recirculation rate when the high pressure side exhaust gas recirculation rate is returned to the base high pressure side exhaust gas recirculation rate after the high pressure side exhaust gas recirculation control valve opening degree is controlled.

17. The exhaust gas control apparatus for the internal combustion engine according to claim 1, wherein an exhaust gas control catalyst is disposed in the engine exhaust passage, a hydrocarbon supply valve is disposed in the engine exhaust passage upstream of the exhaust gas control catalyst, a noble metal catalyst is supported on an exhaust gas flow surface of the exhaust gas control catalyst, the noble metal catalyst includes a basic exhaust gas flow surface, the exhaust gas control catalyst is configured to reduce NOx contained in the exhaust gas when a concentration of hydrocarbons flowing into the exhaust gas control catalyst is vibrated at an amplitude within a range determined in advance and a cycle within a range determined in advance, and the exhaust gas control catalyst is configured to increase a stored amount of the NOx contained in the exhaust gas when a hydrocarbon concentration vibration cycle exceeds the range determined in advance, the electronic control unit is configured to selectively perform a first NOx removal control and a second NOx removal control, the first NOx removal control is a control for removing the NOx contained in the exhaust gas by the hydrocarbons being injected from the hydrocarbon supply valve at the cycle within the range determined in advance, and the second NOx removal control is a control for releasing the stored NOx from the exhaust gas control catalyst and removing the NOx by the air-fuel ratio of the exhaust gas flowing into the exhaust gas control catalyst being enriched at a cycle exceeding the range determined in advance, and the electronic control unit is configured to perform the rich control such that the air-fuel ratio of the exhaust gas flowing into the exhaust gas control catalyst becomes richer than a stoichiometric air-fuel ratio with regard to the second NOx removal control.

* * * * *